(12) United States Patent
Adsumilli

(10) Patent No.: US 9,877,036 B2
(45) Date of Patent: Jan. 23, 2018

(54) INTER FRAME WATERMARK IN A DIGITAL VIDEO

(71) Applicant: GoPro, Inc., San Mateo, CA (US)

(72) Inventor: Balineedu Chowdary Adsumilli, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 421 days.

(21) Appl. No.: 14/598,135

(22) Filed: Jan. 15, 2015

(65) Prior Publication Data

US 2016/0212441 A1    Jul. 21, 2016

(51) Int. Cl.
*H04N 19/467* (2014.01)
*H04N 19/63* (2014.01)
*H04N 1/32* (2006.01)
*G06T 1/00* (2006.01)

(52) U.S. Cl.
CPC ......... *H04N 19/467* (2014.11); *G06T 1/0028* (2013.01); *H04N 1/32187* (2013.01); *H04N 1/32277* (2013.01); *H04N 1/32288* (2013.01); *H04N 19/63* (2014.11); *G06T 2201/0052* (2013.01); *G06T 2201/0083* (2013.01); *G06T 2201/0202* (2013.01)

(58) Field of Classification Search
CPC .. H04N 19/467; H04N 19/63; H04N 1/32187; H04N 1/32277; H04N 1/32288; G06T 1/0028; G06T 220/0052; G06T 2201/0083; G06T 2201/0202
See application file for complete search history.

(56) References Cited

U.S. PATENT DOCUMENTS

| 4,179,704 A | 12/1979 | Kaiser et al. |
| 6,504,569 B1 | 1/2003 | Jasinschi et al. |
| 6,611,607 B1 | 8/2003 | Davis et al. |

(Continued)

OTHER PUBLICATIONS

PCT International Search Report and Written Opinion for PCT/US16/12231, May 12, 2016, 34 Pages.

(Continued)

*Primary Examiner* — Thai Tran
*Assistant Examiner* — Christopher T Braniff
(74) *Attorney, Agent, or Firm* — Gazdzinski & Associates, PC

(57) ABSTRACT

Watermark data is converted to watermark coefficients, which may be embedded in an image by converting the image to a frequency domain, embedding the watermark in image coefficients corresponding to medium-frequency components, and converting the modified coefficients to the spatial domain. The watermark data is extracted from the modified image by converting the modified image to a frequency domain, extracting the watermark coefficients from the image coefficients, and determining the watermark data from the watermark coefficients. The watermark data may be truncated image data bits such as truncated least significant data bits. After extraction from the watermark, the truncated image data bits may be combined with data bits representing the original image to increase the bit depth of the image. Watermark data may include audio data portions corresponding to a video frame, reference frames temporally proximate to a video frame, high-frequency content, sensor calibration information, or other image data.

26 Claims, 13 Drawing Sheets

(56) References Cited

U.S. PATENT DOCUMENTS

| | | | |
|---|---|---|---|
| 6,728,317 | B1 | 4/2004 | Demos |
| 6,996,244 | B1 | 2/2006 | Slaney et al. |
| 7,750,904 | B2 | 7/2010 | Jojic et al. |
| 8,290,253 | B1 | 10/2012 | Wang et al. |
| 8,606,073 | B2 | 12/2013 | Woodman |
| 9,171,577 | B1 | 10/2015 | Newman et al. |
| 9,396,588 | B1 | 7/2016 | Li |
| 9,547,908 | B1 | 1/2017 | Kim et al. |
| 9,575,803 | B2 | 2/2017 | Chauvet et al. |
| 9,681,111 | B1 | 6/2017 | Newman |
| 2003/0007567 | A1 | 1/2003 | Newman et al. |
| 2003/0147547 | A1 | 8/2003 | Lin et al. |
| 2004/0017504 | A1 | 1/2004 | Prandoni et al. |
| 2004/0034781 | A1 | 2/2004 | Natarajan |
| 2004/0131229 | A1 | 7/2004 | Acharya et al. |
| 2005/0117805 | A1 | 6/2005 | Poutet et al. |
| 2006/0071825 | A1* | 4/2006 | Demos .............. H03M 7/24 341/50 |
| 2006/0251289 | A1* | 11/2006 | Williams ............ G06T 1/0085 382/100 |
| 2007/0110298 | A1 | 5/2007 | Graepel et al. |
| 2008/0170626 | A1 | 7/2008 | Sung et al. |
| 2008/0180439 | A1 | 7/2008 | Adabala et al. |
| 2008/0270569 | A1 | 10/2008 | McBride et al. |
| 2008/0276089 | A1 | 11/2008 | Tian |
| 2009/0132371 | A1 | 5/2009 | Strietzel et al. |
| 2009/0153730 | A1 | 6/2009 | Knee et al. |
| 2009/0324191 | A1 | 12/2009 | Reusens et al. |
| 2010/0177977 | A1 | 7/2010 | Seshadri et al. |
| 2010/0266157 | A1 | 10/2010 | Shin et al. |
| 2011/0286625 | A1 | 11/2011 | Petrovic et al. |
| 2012/0002112 | A1 | 1/2012 | Huang et al. |
| 2012/0063670 | A1 | 3/2012 | Woo |
| 2012/0170805 | A1 | 7/2012 | Brown et al. |
| 2012/0281871 | A1* | 11/2012 | Reed .................. G06T 1/0021 382/100 |
| 2013/0314442 | A1 | 11/2013 | Langlotz et al. |
| 2014/0022394 | A1 | 1/2014 | Bae et al. |
| 2014/0050454 | A1 | 2/2014 | Slotte |
| 2014/0063061 | A1 | 3/2014 | Reitan |
| 2014/0267801 | A1 | 9/2014 | Grundmann et al. |
| 2015/0371447 | A1 | 12/2015 | Yasutake |
| 2016/0057363 | A1 | 2/2016 | Posa |
| 2016/0080830 | A1 | 3/2016 | Kim et al. |
| 2016/0125633 | A1 | 5/2016 | Windmark et al. |
| 2016/0205341 | A1 | 7/2016 | Hollander et al. |
| 2016/0239340 | A1 | 8/2016 | Chauvet et al. |
| 2016/0274338 | A1 | 9/2016 | Davies et al. |
| 2016/0358628 | A1 | 12/2016 | Liu et al. |
| 2016/0366396 | A1 | 12/2016 | Kim et al. |

OTHER PUBLICATIONS

Boucherkha, S., et al., "A Lossless Watermarking Based Authentication System for Medical Images", Would Academy of Science, Engineering and Technology, International Journal of Medical, Health, Biomedical, Bioengineering and Pharmaceutical Engineering, 2007, vol. 1, No. 1, pp. 20-23.

Fridrich, J., et al., "Lossless Data Embedding—New Paradigm in Digital Watermarking", EURASIP Journal on Applied Signal Processing, Oct. 29, 2001, pp. 185-196.

Kaur, M., et al., "A Review on Digital Watermarkign Using LSB", International Journal of Advanced Research in Computer Science and Software Engineering, Nov. 2005, vol. 5, Issue 11, pp. 1210-1214.

Adsumilli C. et al., "Error Concealment in Video Communications by Informed Watermarking", PSIVT, 2006, pp. 1094-1102.

Adsumilli C. et al., "A Robust Error Concealment Technique Using Data Hiding for Image and Video Transmission Over Lossy Channels", IEEE Transactions on Circuits and Systems for Video Technology, Nov. 2005, pp. 1394-1406, vol. 15(11).

Adsumilli C. et al., "Error Concealment in Video Communications Using DPCM Bit Stream Embedding", Proceedings IEEE International Conference on Acoustics, Speech and Signal Processing (ICASSP), Apr. 2005, pp. II-169-II-172, Philadelphia, USA.

Adsumilli C. et al., "Detector Performance Analysis of Watermark-Based Error Concealment in Image Communications", Proceedings IEEE International Conference on Image Processing, 2005, pp. 916-919, vol. 3.

Adsumilli C. et al., "A Hybrid Constrained Unequal Error Protection and Data Hiding Scheme for Packet Video Transmission", Proceedings IEEE International Conference on Acoustics, Speech, and Signal Processing (ICASSP), Apr. 2003, pp. V680-V683, Hong Kong.

Adsumilli C. et al., "A Dynamically Adaptive Constrained Unequal Error Protection Scheme for Video Transmission over Wireless Channels", Proceedings IEEE International Workshop on Multimedia Signal Processing, 2002, pp. 41-44, Virgin Islands, USA.

Adsumilli C. et al., A Noise Based Quantization Model for Restoring Block Transform Compressed Images:, Proceedings of the IASTED International Conference Signal and Image Processing, Aug. 13-16, 2001, pp. 354-359, Honolulu, Hawaii, USA.

Adsumilli C. et al., "Adapive Wireless Video Communications: Challenges and Approaches", Proceedings of International Workshop on Packet Video, Apr. 2002, pp. 1-11, Pittsburgh, Pennsylvania, USA.

Adsumilli C., "A dissertation submitted in partial satisfaction of the requirements for the degree of Doctor of Philosophy in Electrical and Computer Engineering", Sep. 2005, 193 pages.

Carli M. et al., "Video Watermarking in 3D DCT Domain", Proceedings of International Workshop on Spectral Methods and Multirate Signal Processing, Jun. 2005, pp. 141-144, Riga, Lavia, (Invited Paper).

Tonci F. et al., "Buffer Constraints for Rate-Distortion Optimization in Mobile Video Communications", Proceedings of International Symph on Signals, Circuits and Systems, Jul. 2005, pp. 71-74, Lasi, Romania (Invited Paper).

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.

Allène C., et al., "Seamless Image-based Texture Atlases Using Multi-band Blending," Pattern Recognition, 2008. ICPR 2008. 19th International Conference on, 2008.

Badrinarayanan V., et al., "Segnet: a Deep Convolutional Encoder-Decoder Architecture for Image Segmentation," arXiv preprint arXiv:1511.00561, 2015.

Baker, et al., "A Database and Evaluation Methodology for Optical Flow" International Journal of Computer Vision 92.1 (2011): 1-31.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Brox, et al., "High Accuracy Optical Flow Estimation Based on a Theory for Warping", European Conference on Computer Vision, Springer-Verlag Berlin Heidelberg, 2004.

Burt et al., "A Multiresolution Spline with Application to Image Mosaics," in ACM Transactions on Graphics (TOG), 1983, vol. 2, No. 4, pp. 217-236.

Chan T.F. and Vese LA., "Active contours without edges". IEEE Transactions on Image Processing, 2001, 10 (2), pp. 266-277 (hereinafter "Chan").

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.

(56) References Cited

OTHER PUBLICATIONS

Davis, et al., "The Visual Microphone: Passive Recovery of Sound from Video" (2014).
Didyk, et al., "Joint View Expansion and Filtering for Automultiscopic 3D Displays", ACM Transactions on Graphics (TOG) 32.6 (2013): 221.
Elen R., "Whatever happened to Ambisonics" AudioMedia Magazine, Nov. 1991.
Gracias N., et al., "Fast Image Blending Using Watersheds and Graph Cuts," Image and Vision Computing, 2009, vol. 27 (5), pp. 597-607.
H.264 (Jan. 2012) and/or ISO/IEC 14496☐10:2012, Information technology☐ Coding of audio☐ visual objects ☐ Part 10: Advanced Video Coding.
H.265 (Dec. 2016) also known as High Efficiency Video Code (HVEC),(described in e.g., ITU☐T Study Group 16—Video Coding Experts Group (VCEG)—ITU☐T H.265, and/or ISO/IEC JTC 1/SC 29/WG 11 Motion Picture Experts Group (MPEG)—the HEVC standard ISO/IEC 23008☐2:2015.
Herbst E., et al., "Occlusion Reasoning for Temporal Interpolation Using Optical Flow," Department of Computer Science and Engineering, University of Washington, Tech. Rep. UW-CSE-09-08-01, 2009.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-l 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Shannon, "A Mathematical Theory of Communication", Bell Syst. Tech. J., 27:379-423, 623-656, 1948.
Suzuki et al., "Inter Frame Coding with Template Matching Averaging," in IEEE International Conference on Image Processing Proceedings (2007), vol. (III), pp. 409-412.
Szeliski, et al., "Fast Poisson blending using Multi-Splines." Computational Photography (ICCP), 2011 IEEE International Conference.
Szeliski R., "Computer vision: algorithms and applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Vass, J., et al., "Efficient Three-Dimensional Wavelet Codecs for Networked Video Communication," in Proceedings of IEEE International Conference on Image Processing, Kobe, Japan, Oct. 1999, pp. 565-569.
Wadhwa, et al., "Phase-Based Video Motion Processing", ACM Transactions on Graphics (TOG) 32.4 (2013): 80.
Weinzaepfel, et al., "Deepflow: Large displacement optical flow with deep matching", Proceedings of the IEEE International Conference on Computer Vision, 2013.
Xiao J., and Quan L., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.
Cavallaro, et al., "Object-based video: extraction tools, evaluation metrics and applications", Visual Communications and Image Processing; Jul. 8, 2003-Jul. 11, 2003, Lugano Switzerland, XP030080620.
Freeman, et al., "Shape-Time Photography" IEEE Computer Society Conference on Computer Vision and Pattern Recognition, vol. 2. IEEE, 2003.
Haouzia et al., "Methods for Image Authentication: A Survey," Multimedia Tools Appl, 2008, 46 pages.
Huang, et al., "Maximum a Posteriori Probability Estimation for Online Surveillance Video Synopsis", IEEE Transactions on Circuits and Systems for Video Technology, IEEE Service Center, Piscataway, NJ, US, vol. 24, No. 8, Aug. 1, 2014 (Aug. 1, 2014), pp. 1417-1429.
Schnyder, et al., "Depth image based compositing for stereo 3D", 3DTV-Conference: The True Vision—Capture, Transmission and Display of 3D Video (3DTV-CON), 2012, IEEE, Oct. 15, 2012, pp. 1-4.
Schnyder L., et al., "2D to 3D Conversion of Sports Content using Panoramas," Image Processing (ICIP), 2011, IEEE, pp. 1961-1964.

\* cited by examiner

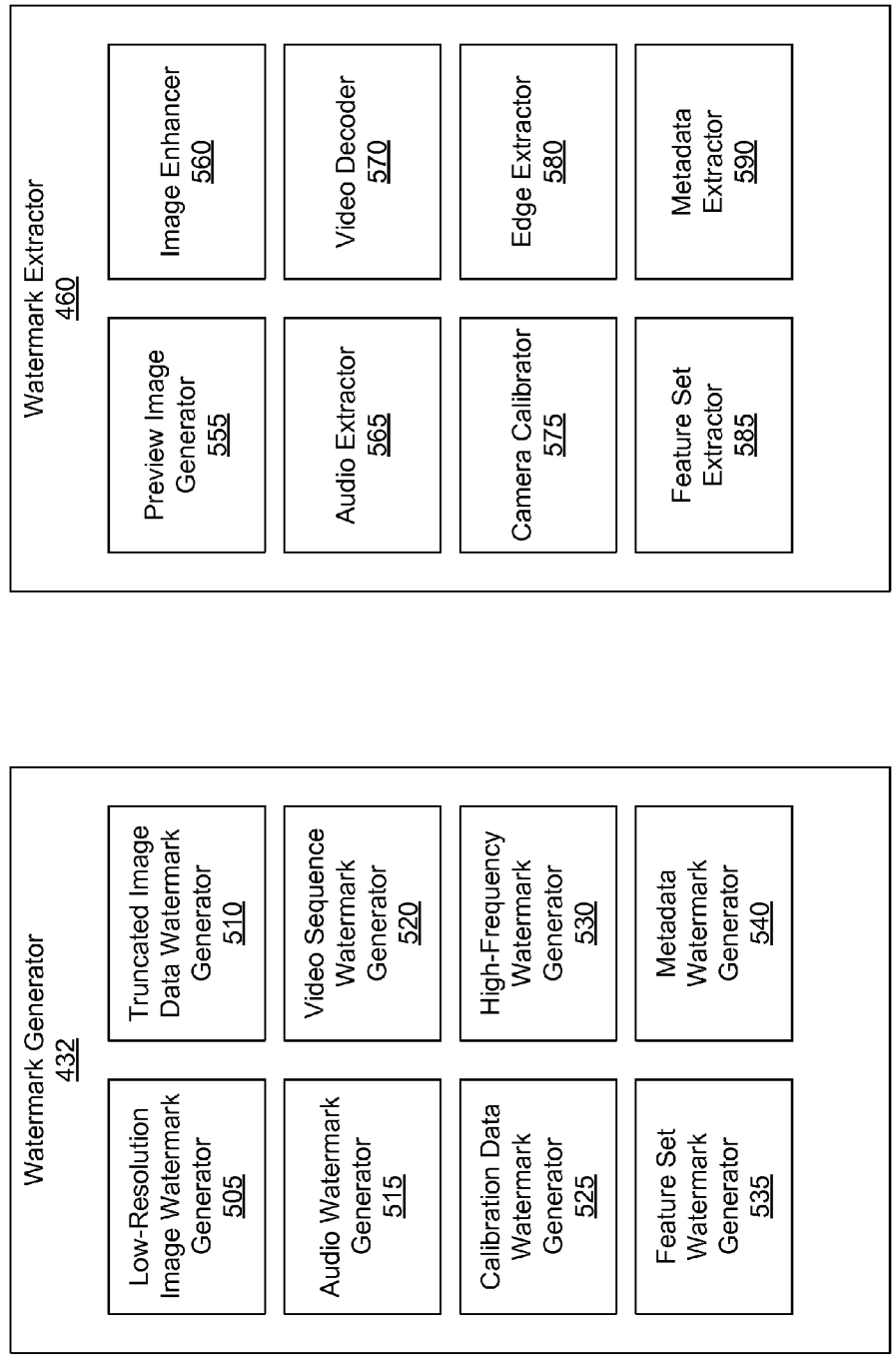

INTER FRAME WATERMARK IN A DIGITAL VIDEO

BACKGROUND

1. Field of Art

The disclosure generally relates to the field of digital image and video processing, and more particularly to embedding information in digital content using a watermark.

2. Description of the Related Art

Digital cameras capture images using an electronic image sensor. To reduce memory used to store an image and bandwidth used to send an image, the captured image data can be compressed. However, compression reduces the quality of the resulting image, so there is a tradeoff between image quality and size of the compressed image. In some cameras, the image sensor captures more detailed image data than can be feasibly stored or transmitted, particularly when the camera captures multiple images to form a video. Current compression processes are inadequate to produce images that exploit improved image quality from these cameras without significantly increasing the size of compressed image data.

SUMMARY

The present disclosure satisfies the foregoing needs by providing, inter alia, methods and apparatus for improved compression of images by embedding of information in digital content.

In one aspect of the present disclosure, a method for reconstructing a video frame is disclosed. In one embodiment, the method includes accessing a modified reference frame from a video, the modified reference frame temporally proximate to a degraded frame in the video, the modified reference frame including a watermark representative of a low-resolution version of the degraded frame; generating a transformed image frame by converting the modified reference frame into a set of image coefficients in a frequency domain; extracting a set of watermark coefficients representative of the watermark; converting the set of watermark coefficients into a first approximation of the degraded frame generating a second approximation of the degraded frame using a motion vector between the modified reference frame and the first approximation of the degraded frame; and storing the second approximation of the degraded frame in place of the degraded frame, the storing the second approximation of the degraded frame including: generating a third approximation of the degraded frame by modifying the second approximation of the degraded frame using a set of low-frequency coefficients determined from the set of watermark coefficients, the generating of the third approximation of the degraded frame including: generating a set of reconstructed frame coefficients by converting the second approximation of the degraded image into the frequency domain; identifying a subset of reconstructed frame coefficients corresponding to low-frequency coefficients; modifying the set of reconstructed frame coefficients by replacing the subset of reconstructed frame coefficients with the set of low-frequency coefficients determined from the watermark coefficients; and generating the third approximation of the degraded frame by converting the modified set of reconstructed frame coefficients into the spatial domain; and storing the third approximation of the degraded frame in place of the degraded frame.

In a second aspect, a non-transitory computer-readable medium is disclosed. In one embodiment, the non-transitory computer-readable medium includes a computer program having a plurality of instructions for reconstructing a video frame, the plurality of instructions being executable by at least one processor apparatus to perform steps including: accessing a modified reference frame from a video, the modified reference frame temporally proximate to a degraded frame in the video, the modified reference frame including a watermark representative of a low-resolution version of the degraded frame; generating a transformed image frame by converting the modified reference frame into a set of image coefficients in a frequency domain; extracting a set of watermark coefficients representative of the watermark; converting the set of watermark coefficients into a first approximation of the degraded frame; generating a second approximation of the degraded frame using a motion vector between the modified reference frame and the first approximation of the degraded frame; and storing the second approximation of the degraded frame in place of the degraded frame in the computer-readable medium; wherein the storing of the second approximation of the degraded frame includes: generating a third approximation of the degraded frame by modifying the second approximation of the degraded frame using a set of low-frequency coefficients determined from the set of watermark coefficients; and storing the third approximation of the degraded frame in place of the degraded frame; and wherein the generating of the third approximation of the degraded frame includes: generating a set of reconstructed frame coefficients by converting the second approximation of the degraded image into the frequency domain; identifying a subset of reconstructed frame coefficients corresponding to low-frequency coefficients; modifying the set of reconstructed frame coefficients by replacing the subset of reconstructed frame coefficients with the set of low-frequency coefficients determined from the watermark coefficients; and generating the third approximation of the degraded frame by converting the modified set of reconstructed frame coefficients into the spatial domain.

In a third aspect, a camera apparatus is disclosed. In one embodiment, the camera apparatus is configured to reconstruct a video frame, the camera apparatus including: an image sensor configured to capture a video, the video including a plurality of frames captured by the image sensor; a processor apparatus; a non-transitory computer-readable storage medium having a computer program thereon, the computer program including a plurality of instructions configured to, when executed by the processor apparatus, cause the processor apparatus to: access a modified reference frame from the video, the modified reference frame being temporally proximate to a degraded frame in the video, the modified reference frame including a watermark representative of a low-resolution version of the degraded frame; generate a transformed image frame, the generation of the transformed image frame including a conversion of the modified reference frame into a set of image coefficients in a frequency domain; extract a set of watermark coefficients representative of the watermark; convert the set of watermark coefficients into a first approximation of the degraded frame; generate a second approximation of the degraded frame via a motion vector between the modified reference frame and the first approximation of the degraded frame; and store the second approximation of the degraded frame in place of the degraded frame; wherein the storage of the second approximation of the degraded frame includes: generation of a third approximation of the degraded frame by modifying the second approximation of the degraded frame using a set of low-frequency coefficients determined from the set of watermark coefficients; and storage of the third approximation of the degraded frame in place of the degraded frame, wherein the generation of the third approximation of the degraded frame includes: generation of a set of reconstructed frame coefficients via conversion of the second approximation of the degraded image into the frequency domain; identification of a subset of reconstructed frame coefficients corresponding to low-frequency coefficients; modification of the set of reconstructed frame coefficients via replacement of the subset of reconstructed frame coefficients with the set of low-frequency coefficients determined from the watermark coefficients; and generation of the third approximation of the degraded frame via conversion the modified set of reconstructed frame coefficients into the spatial domain.

In a fourth aspect, a computerized apparatus is disclosed. In one embodiment, the computerized apparatus is configured to reconstruct a video frame, the apparatus including: means for accessing a modified reference frame from a video, the modified reference frame temporally proximate to a degraded frame in the video, the modified reference frame including a watermark representative of a low-resolution version of the degraded frame; means for generating a transformed image frame via conversion of the modified reference frame into a set of image coefficients in a frequency domain; means for extracting a set of watermark coefficients representative of the watermark; means for converting the set of watermark coefficients into a first approximation of the degraded frame; means for generating a second approximation of the degraded frame via a motion vector between the modified reference frame and the first approximation of the degraded frame; and means for storing the second approximation of the degraded frame in place of the degraded frame; wherein the means for storing of the second approximation of the degraded frame includes: means for generating a third approximation of the degraded frame by modifying the second approximation of the degraded frame via a set of low-frequency coefficients determined from the set of watermark coefficients; and means for storing the third approximation of the degraded frame in place of the degraded frame; and wherein the means for generating of the third approximation of the degraded frame includes: means for generating a set of reconstructed frame coefficients via conversion of the second approximation of the degraded image into the frequency domain; means for identifying a subset of reconstructed frame coefficients corresponding to low-frequency coefficients; means for modifying the set of reconstructed frame coefficients via replacement of the subset of reconstructed frame coefficients with the set of low-frequency coefficients determined from the watermark coefficients; and means for generating the third approximation of the degraded frame via conversion of the modified set of reconstructed frame coefficients into the spatial domain.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5a is a block diagram of a watermark generator, according to one embodiment.

FIG. 5b is a block diagram of a watermark extractor, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embedding A Watermark

Figure 1:
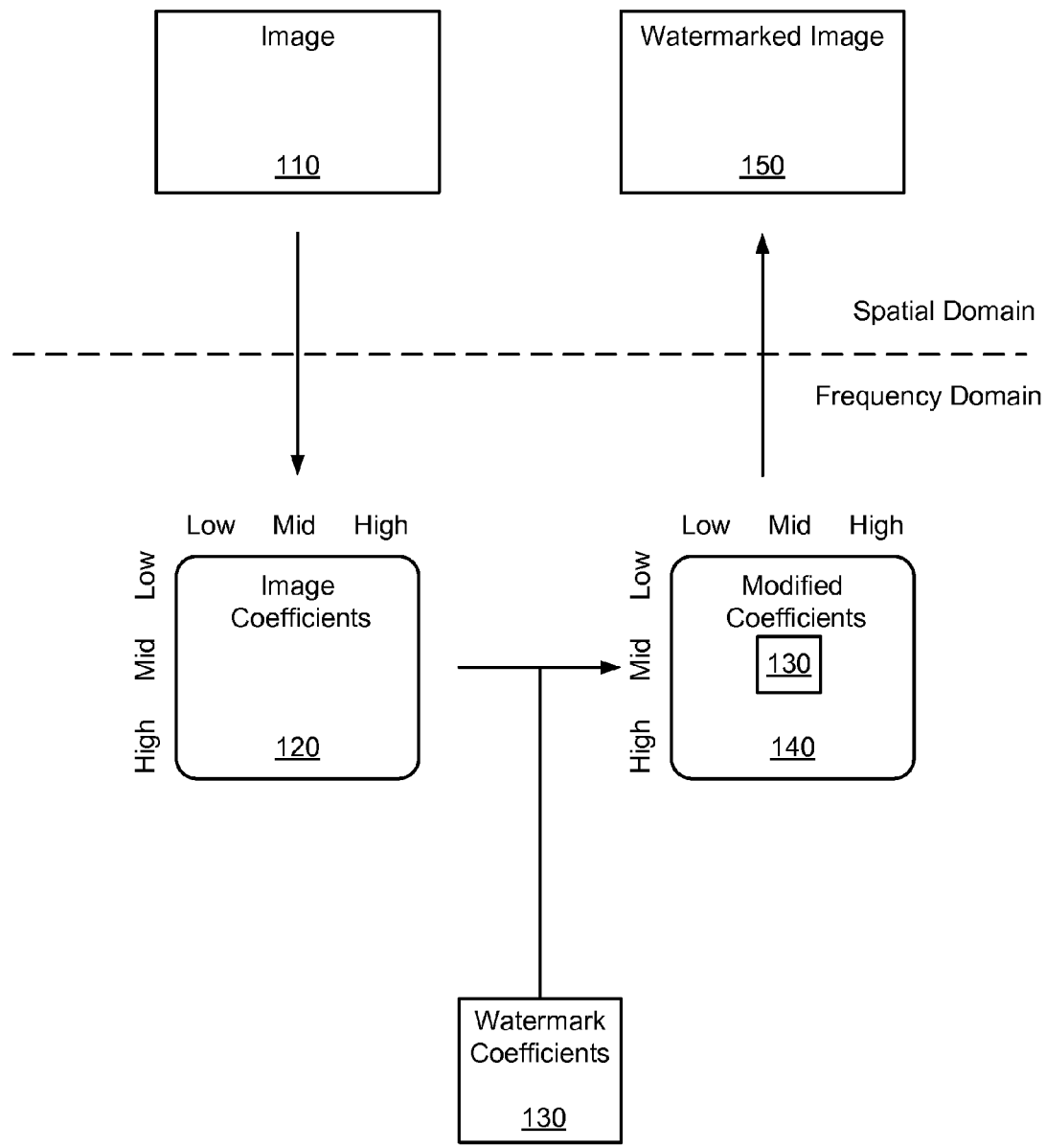
FIG. 1 is a conceptual diagram illustrating generation of watermarked images, according to one embodiment.

FIG. 1 is a conceptual diagram illustrating generation of watermarked images, according to one embodiment. An image 110 contains image data in the spatial domain. For example, the image 110 is a still image or a video frame captured by a camera. In one embodiment, the image data includes pixels captured over one or more channels. For example, the image data is an array of 1080 vertical pixels by 1920 horizontal pixels. A channel indicates intensity of light captured over a broad or narrow spectrum of light wavelengths or frequencies. For example, the image data includes one channel (e.g., grayscale), or three channels (e.g., RGB (red, green, blue)).

Image data is represented in the spatial domain, where a pixel corresponds to a position in space (e.g., two-dimensional space, three-dimensional space). The image 110 can be converted from the spatial domain to image coefficients 120 in a frequency domain. For example, the conversion uses a linear transform such as the discrete Fourier transform or a discrete cosine transform. For these transforms, the image coefficients indicate the relative weighting of different spatial frequencies in a linear decomposition of the image data into transform-specific basis functions (e.g., cosines, sines, complex exponentials). As used herein, the frequency domain may also refer to the domain of other transforms (e.g., the wavelet transform) that convert image data to a non-spatial domain even if the domain does not correspond to spatial or temporal frequencies.

The watermark coefficients 130 represent watermark data. Examples of watermark data include: a low-resolution version of the image 110, truncated image bits from the image data, a low-resolution version of a video frame, audio data, camera calibration metadata, sensor correction metadata, high-frequency content, and features sets describing the content of the image 110. The description corresponding to FIG. 5a further describes the generation of watermark coefficients 130 representing these various types of data.

The watermark coefficients 130 are embedded in the image coefficients 120 to produce modified coefficients 140. For image coefficients 120 representing the frequency content of an image 110, coefficients corresponding to lower frequencies correspond to information that is more noticeable in the image 110 than the information in the coefficients corresponding to higher frequencies. Accordingly, lossy image compression processes typically discard coefficients corresponding to higher frequencies. The watermark coefficients are embedded in the image coefficients 120 by modifying coefficients representing medium frequencies with the watermark coefficients 130. Modifying coefficients representing low frequency image content would noticeably alter the quality of the resulting host image 150. On the other hand, modifying coefficients representing high frequency image content could result in the compression process impacting the watermark coefficients. Hence, embedding the watermark coefficients 130 by modifying medium-frequency coefficients reduces distortion of image data while reducing distortion of watermark data by subsequent compression. Modifying frequency coefficients with watermark coefficients 130 may refer to dithering watermark coefficients to modify the watermark coefficients 130 without significantly changing the value of the modified frequency coefficients. For example, the watermark coefficients 130 are represented as pseudo-random noise having a magnitude of 0.1-1.2% of the value of the medium-frequency coefficients. In the example, the pseudo-random noise is added to medium-frequency coefficients of the image coefficients 120. In an alternative embodiment, medium-frequency image coefficients of the image coefficients 120 are replaced by the watermark coefficients 130.

The resulting modified coefficients 140 are converted from the frequency domain to the spatial domain to produce the watermarked image 150. For example, the modified coefficients 140 are converted using an inverse of the transform used to generate the image coefficients 120 from the image 110. When watermark coefficients are embedded through dithering, the changes between the image 110 and the watermarked image 150 are not subjectively visible to a viewer. The watermarked image 150 can be transmitted, stored, compressed, or a combination thereof. Subsequently, the watermark coefficients can be extracted from the watermarked image 150 to produce the watermark data, as described further in conjunction with FIG. 5b.

Example Camera System Configuration

A camera system includes a camera and a camera housing structured to at least partially enclose the camera. The camera includes a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 2A:
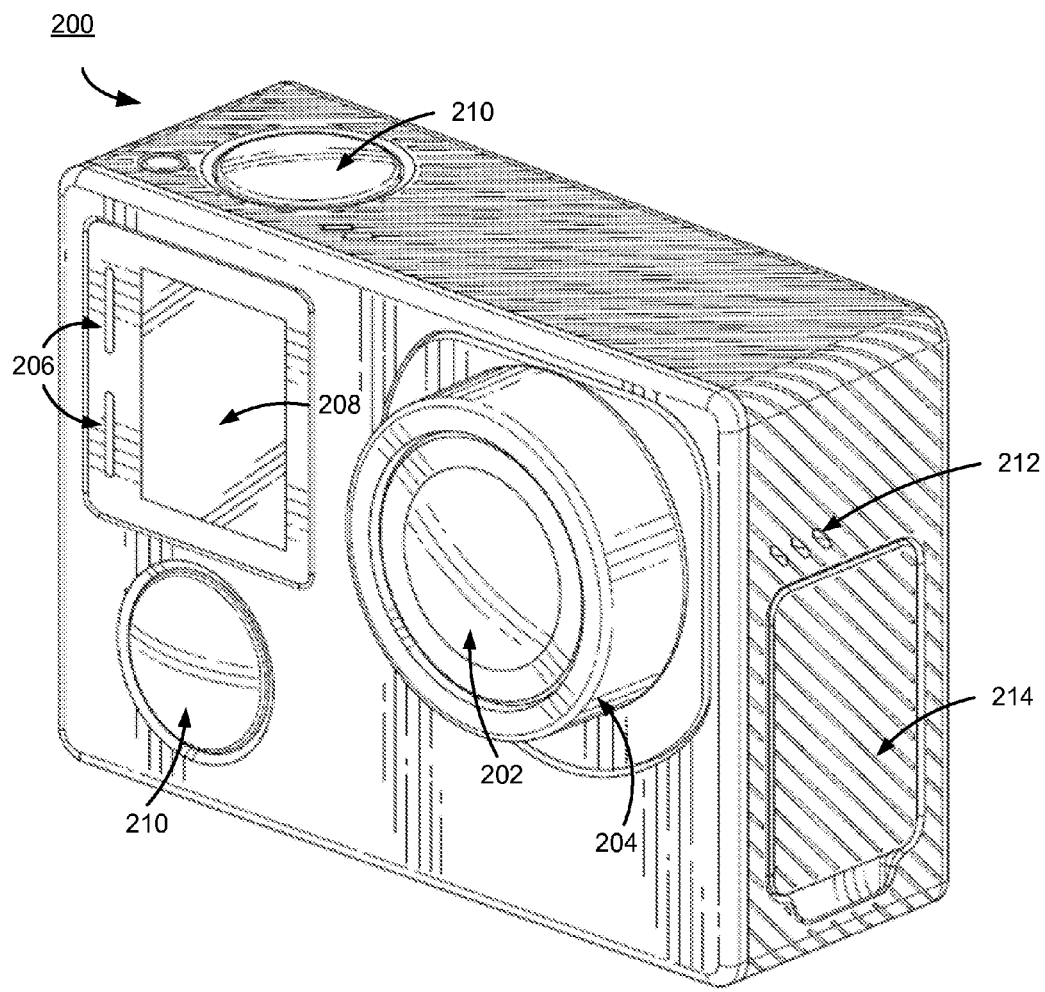
FIG. 2a illustrates a front perspective view of an example camera, according to one embodiment.

FIG. 2a illustrates a front perspective view of an example camera 200, according to one embodiment. The camera 200 is configured to capture images and video, and to store captured images and video for subsequent display or playback. The camera 200 is adapted to fit within a camera housing. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within a housing, the LED lights and the LED display 208 are configured to be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
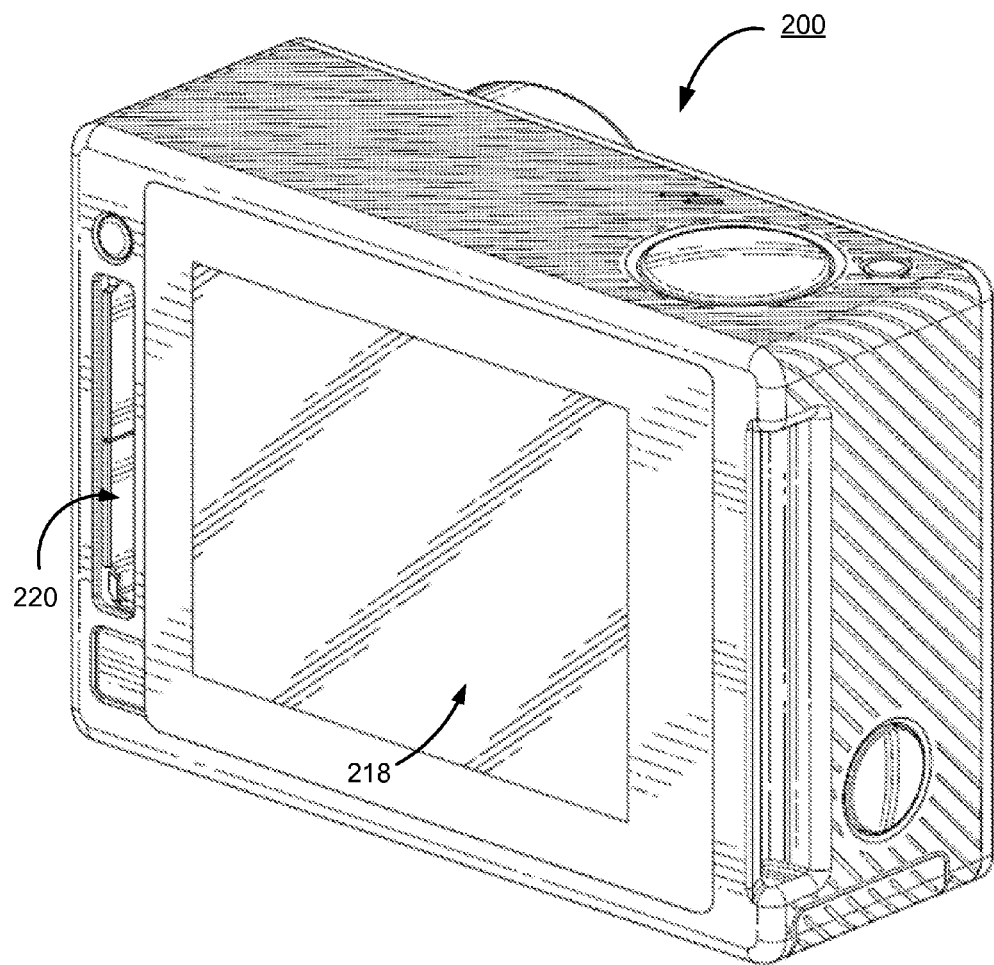
FIG. 2b illustrates a rear perspective view of an example camera, according to one embodiment

FIG. 2b illustrates a rear perspective view of the example camera 200, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Example Camera Configuration

Figure 3:
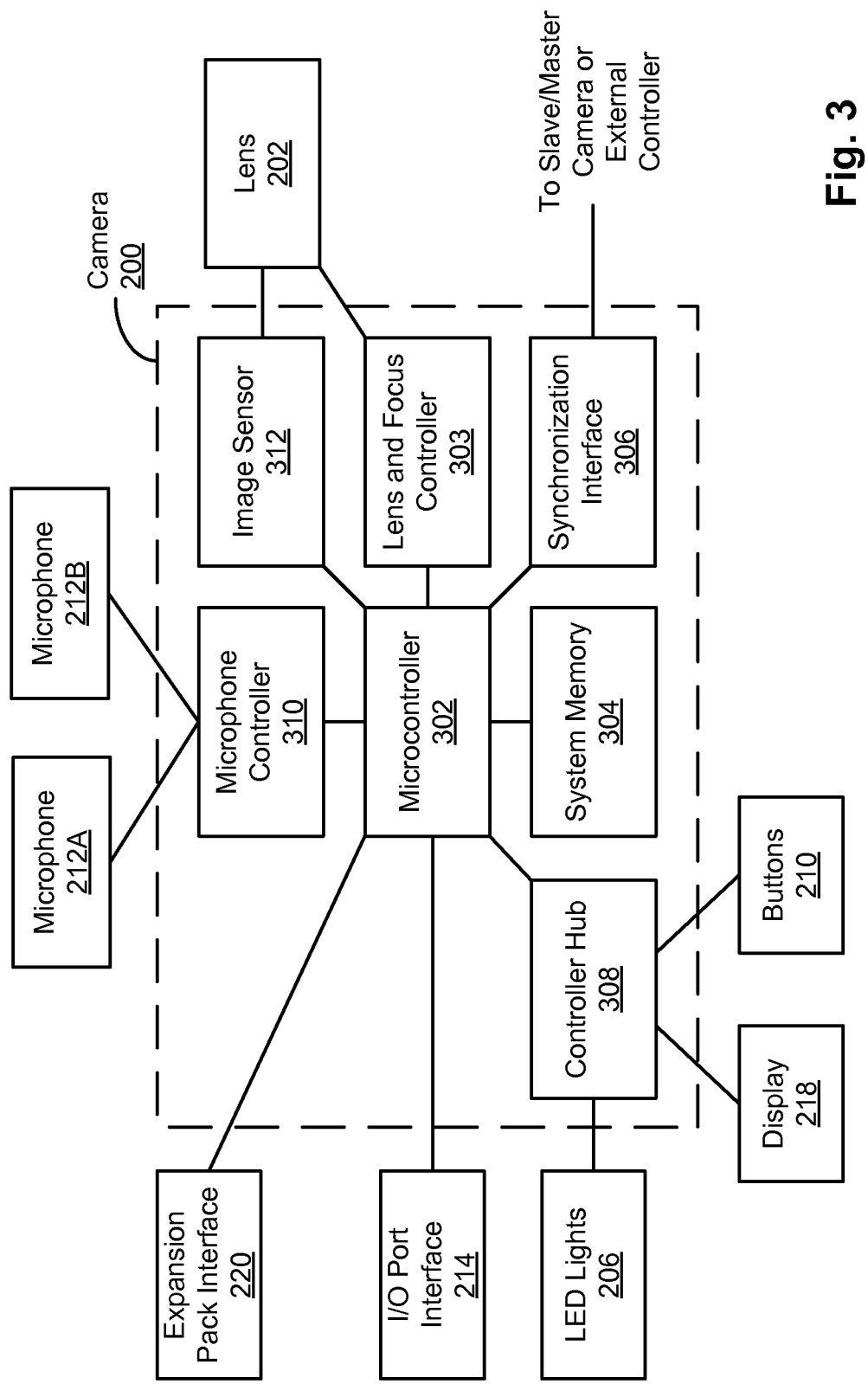
FIG. 3 is a block diagram illustrating an example camera architecture, according to one embodiment.

FIG. 3 is a block diagram illustrating an example camera architecture, according to one embodiment. The camera 200 includes one or more microcontrollers 302 (such as a processor) that control the operation and functionality of the camera 200.

A lens and focus controller 303 is configured to control the operation and configuration of the camera lens 202, for instance based on user input or based on analysis of captured image data. The image sensor 312 is a device capable of electronically capturing light incident on the image sensor 312. In one embodiment, CMOS sensors are used, including transistors, photodiodes, amplifiers, analog-to-digital converters, and power supplies. Alternatively, the image sensor 312 is a CCD sensor.

A system memory 304 is configured to store executable computer instructions that, when executed by the microcontroller 302, perform the camera functionalities described herein. The system memory 304 also stores images captured using the lens 202 and image sensor 312. The memory 304 may contain volatile memory (e.g., random access memory (RAM)), non-volatile memory (e.g., a flash memory), or a combination thereof.

A synchronization interface 306 is configured to communicatively couple the camera 200 with external devices, such as a remote control, another camera (such as a slave camera or master camera), a computer, or a smartphone. The synchronization interface 306 may transfer information through a network, which allows coupled devices, including the camera 200, to exchange data other over local-area or wide-area networks. The network may contain a combination of wired or wireless technology and make use of various connection standards and protocols, such as WiFi, IEEE 1394, Ethernet, 802.11, 4G, or Bluetooth.

A controller hub 308 transmits and receives information from user I/O components. In one embodiment, the controller hub 308 interfaces with the LED lights 206, the display 208, and the buttons 210. However, the controller hub 308 can interface with any conventional user I/O component or components. For example, the controller hub 308 may send information to other user I/O components, such as a speaker.

The microphone controller 310 is configured to control the operation of the microphones 212. In some embodiments, the microphone controller 310 selects which microphones from which audio data is captured. For instance, for a camera 200 with multiple microphone pairs (each pair including a standard microphone and a dampened microphone), the microphone controller 310 selects one microphone of the pair to capture audio data.

Additional components connected to the microcontroller 302 include an I/O port interface 214 and an expansion pack interface 220. The I/O port interface 214 may facilitate the camera 200 in receiving or transmitting video or audio information through an I/O port. Examples of I/O ports or interfaces include USB ports, HDMI ports, Ethernet ports, audio ports, and the like. Furthermore, embodiments of the I/O port interface 214 may include wireless ports that can accommodate wireless connections. Examples of wireless ports include Bluetooth, Wireless USB, Near Field Communication (NFC), and the like. The expansion pack interface 220 is configured to interface with camera add-ons and removable expansion packs, such as an extra battery module, a wireless module, and the like.

Image Processing

Figure 4:
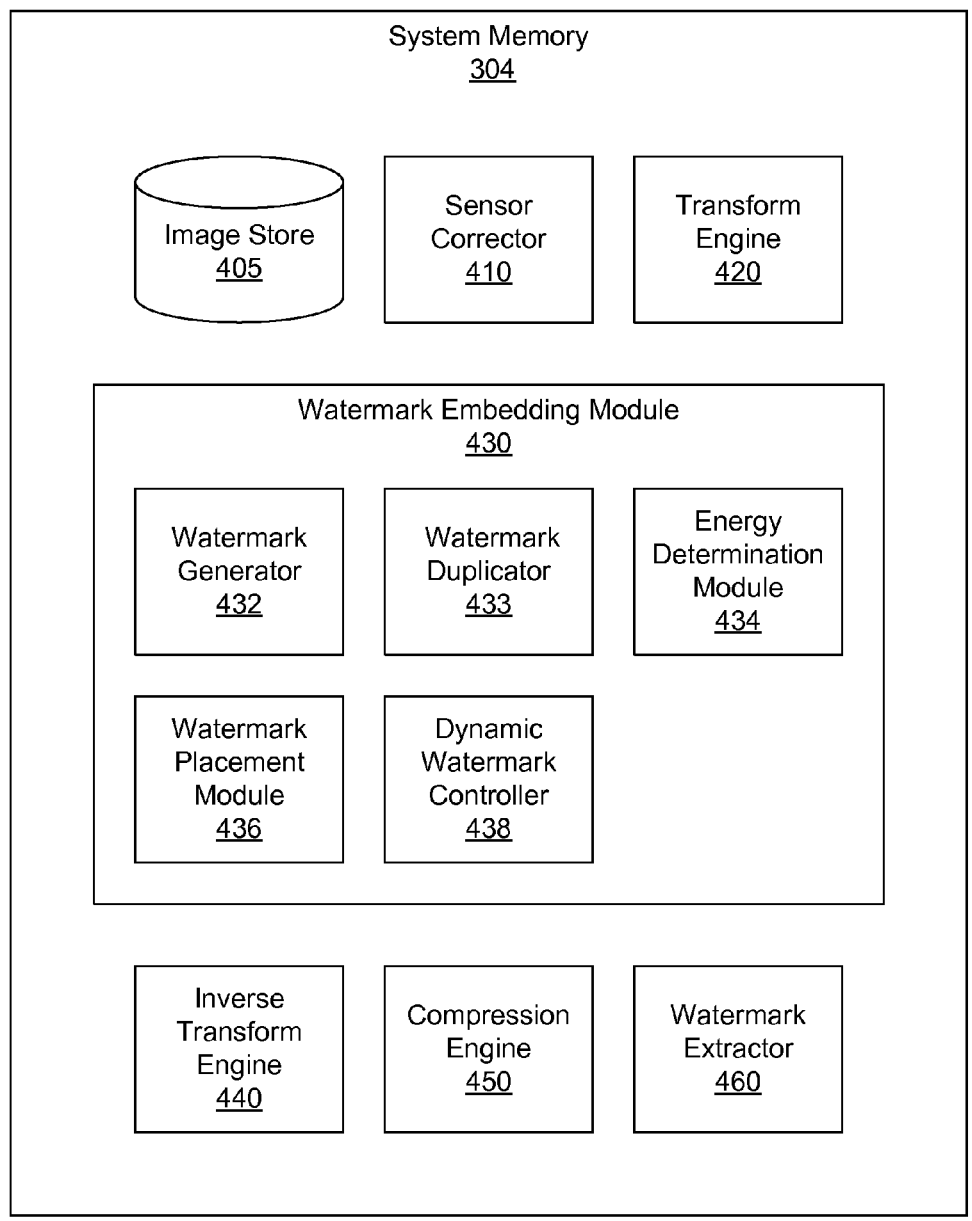
FIG. 4 is a block diagram of a system for processing a captured image, according to one embodiment.

FIG. 4 is a block diagram of a system for processing a captured image, according to one embodiment. The system includes modules stored on memory 304 including an image store 405, a sensor corrector 410, a transform engine 420, a watermark embedding module 430, an inverse transform engine 440, a compression engine 450, and a watermark extractor 460. Various embodiments may have additional, omitted, or alternative modules configured to perform at least some of the described functionality. It should be noted that in other embodiments, the modules described herein can be implemented in hardware, firmware, or a combination of hardware, firmware, and software. In addition, in some embodiments, the illustrated functionality is distributed across one or more cameras or one or more computing devices. For example, a first camera 200 implements the modules 410-450 to capture an image and generate a compressed, watermarked image. Continuing the example, the compressed, watermarked image from the first camera is decoded by a computing device or a second camera that implements the watermarked extractor 460. Alternatively or additionally, an external computing device embeds and compresses the watermark after capture by the camera 200.

The image store 405 is configured to store images captured by the image sensor 312. In some embodiments, the image store 405 contains compressed image data compressed by the compression engine 450, but the image store 405 can also contain raw image data from the image sensor 312, corrected image data from the sensor corrector 410, uncompressed image data, or watermarked image data from the inverse transform engine 440. The image store 405 may contain image data received from another camera through the synchronization interface 306, or image data stored on a removable memory accessed through the I/O port interface 214 or expansion pack interface 220. The image store 405 may contain watermark data extracted from image data, or approximations of original image data generated by the watermark extractor 460.

The sensor corrector 410 accesses raw image data captured by the image sensor 312, modifies the raw image data based on properties of the image sensor, and outputs corrected image data. For example, the sensor corrector 410 corrects black level, defective pixels (e.g., dead pixels that produce no image data, hot pixels that produce saturated image data), auto white balance, or lens shading corrections. The sensor corrections may modify distortion due to inherent properties of the camera (e.g., properties of the lens 202), settings of the camera (e.g., zoom level), or a combination thereof. For example, the sensor corrector 410 corrects lens shading of raw images using a lens shading correction table and corrects tone in raw images using a tone curve table. Example settings of the camera include exposure and focus statistics automatically selected by the lens and focus controller 303 for capturing an image.

The transform engine 420 accesses image data (e.g., corrected image data from the sensor corrector 410), converts the image data from a spatial domain to a frequency domain, and outputs image coefficients representative of the image in the frequency domain ("image coefficients" hereinafter). In one embodiment, the transform engine 420 applies a linear transform the image data to produce the image coefficients. For example, the linear transform is the discrete Fourier transform, the fast Fourier transform, a discrete cosine transform, a fast cosine transform, a discrete wavelet transform, or a fast wavelet transform. The transform engine 420 may obtain the image coefficients from another process occurring before the camera embeds a watermark in captured image data. For example, the lens and focus controller 303 computes the image coefficients to automatically focus the lens 202, and the transform engine 420 obtains the image coefficients from the lens and focus controller 303.

The watermark embedding module 430 accesses image coefficients corresponding to an image (e.g., from the transform engine 420), embeds a watermark to create modified image coefficients, and outputs the modified image coefficients. The watermark embedding module 430 also accesses watermark data to embed in the image coefficients and generates watermark coefficients representing the watermark data. The watermark embedding module 430 embeds the watermark coefficients in a subset of the image coefficients. In some embodiments, the watermark embedding module 430 dynamically determines which subset of the image coefficients to select for embedding the watermark based on the values of the image coefficients. In some embodiments, the watermark coefficients are dynamically generated based an anticipated compression rate determined by the compression engine 450.

The watermark embedding module 430 includes a watermark generator 432, a watermark duplicator 433, an energy determination module 434, a watermark placement module 436, and a dynamic watermark controller 438. It should be noted that the modules described in the embodiment of FIG. 4 are just one means of implementing the functions described herein, and in some embodiments, different or additional modules perform similar or additional functions. In addition, in some embodiments, certain functions are not performed.

The watermark generator 432 accesses watermark data and generates watermark coefficients representing the watermark data. In one embodiment, the watermark generator 432 generates fewer watermark coefficients than the number of image coefficients in the image. The number and size of the watermark coefficients may vary depending on the type of data encoded. For example, the watermark can have one sixty-fourth as many coefficients as the number of pixels in an image when the watermark coefficients include a representation of a low-resolution version of the image. As another example, the watermark can include only a few coefficients to encode data describing calibration metadata or feature sets. In some embodiments, the watermark generator 432 generates a watermark representing various types of metadata in a standardized format. For example, different calibration metadata are encoded in a standardized order.

In some embodiments, the watermark generator 432 generates the watermark coefficients using spread-spectrum watermarking. For example, to encode a low-resolution version of an image as watermark coefficients within a set of image coefficients, the watermark generator 432 applies a half-tone dithering effect to the low-resolution version of the image and combines (e.g., by matrix multiplication) the half-toned image data with values from a pseudo-random noise generator. In this embodiment, the watermark generator 432 outputs the watermark coefficients and a pseudorandom noise seed of the pseudo-random noise generator. This pseudo-random noise seed is saved as metadata associated with the watermarked image, which the watermark extractor 460 uses to extract the watermark. The watermark generator 432 is described further with respect to FIG. 5a.

The watermark duplicator 433 accesses watermark data and generates watermark coefficients representing a plurality of versions of the watermark data. For example, the watermark coefficients can represent four copies of the watermark data. Multiple versions of the watermark improve recovery of the watermark after compression or transmission, which may introduce errors in individual watermark coefficients extracted from a compressed or transmitted image. The multiple versions can be identical copies or can be different versions dithered using different pseudo-random seed values, which beneficially decreases information lost due to compression or transmission.

The energy determination module 434 accesses image coefficients (e.g., from the inverse transform engine 440) and determines a measure of energy for each of one or more of the image coefficients. The watermark placement module 436 uses the measure of energy to determine a subset of the image coefficients to embed with the watermark coefficients. The measure of energy indicates the relative importance of image coefficients for recreating an approximation of the original data. For example, the measure of energy is the value of the image coefficients after a quantization operation is performed. This example measure of energy indicates whether an image coefficient may be corrupted or significantly altered during image compression or some other process prior to storing or transmitting the watermark.

The watermark placement module 436 accesses the image coefficients and their respective measures of energy. Using the measure of energy, the watermark placement module 436 identifies the position of one or more image coefficients to embed in watermark coefficients (referred to herein as "encoding a watermark within an image"). Positioning the watermark coefficients near low-frequency image components can noticeably alter the resulting modified image. On the other hand, positioning the watermark coefficients in image coefficients representing high frequency components can result in the watermark coefficients being lost or significantly altered by subsequent compression of the image. Thus, in some embodiments, the watermark placement module 436 positions the watermark coefficients to for embedding in image coefficients representing middle frequencies of image data.

In some embodiments, the image coefficients are a positionally organized set of coefficients such as a matrix. For example, the set of coefficients are organized in a two-dimensional matrix with entries corresponding to different combinations of horizontal and vertical spatial frequencies. Entries with low matrix indices (i.e., in the upper-left portion of the matrix) hold image coefficients representing image low frequency components, and entries with high matrix indices (i.e., in the lower-right portion of the matrix) hold image coefficient representing high frequency components. The watermark placement module 436 may place the watermark such that an upper-leftmost watermark coefficient is aligned with the upper-leftmost image coefficient associated with a measure of energy below a threshold. For example, the watermark is placed at middle frequency coefficients having a magnitude less than ten. Alternatively or additionally, the lower-right corner of the watermark is placed at the location of the lower-rightmost image coefficient having a measure of energy above a threshold. Alternatively or additionally, the watermark placement module 436 positions the watermark so that an aggregate of measures of energy corresponding to the image coefficients embedded with the watermark is less than a threshold value. For example, the watermark placement module 436 places the watermark coefficients as close to the upper-left corner as possible while ensuring that the watermark-embedded image coefficients account for less than five percent of the sum total of the measures of energy corresponding to all of the image coefficients.

In some embodiments, the watermark placement module 436 positions the watermark so that the embedded image coefficients have corresponding measures of energy above a first threshold and below a second threshold. Such image coefficients have a "medium" measure of energy and hence store a "medium" amount of information. For example, the first threshold corresponds to a minimum measure of energy, where coefficients with a measure of energy below the minimum are eliminated or distorted during compression. Continuing the example, the second threshold corresponds to a maximum measure of energy, where coefficients with a measure of energy above the maximum correspond to coefficients whose alteration would result in noticeable distortion of the watermarked image. In some embodiments, the watermark placement module 436 determines the size of the watermark (i.e., the number of image coefficients embedded with a version of the watermark) and/or the number of versions of the watermark placed in the image coefficients based on the number or distribution of image having a medium measure of energy.

The watermark placement engine 436 embeds the image coefficients with the watermark coefficients at the determined location and outputs the modified coefficients. In some embodiments, the watermark placement engine 436 also outputs a watermark position indicator identifying indices of the image coefficients for storage in conjunction with the modified coefficients (for instance, within metadata associated with the modified coefficients). For example, the watermark position indicator includes the index of the upper-left corner of the watermark coefficients. In embodiments where multiple versions of the watermark are embedded, the watermark placement position indicator may identify indices corresponding to each copy or version of the watermark. Alternatively or additionally, the watermark placement engine 436 embeds the multiple versions of the watermark in a regular pattern relative to each other, so indices identifying the position of one of the watermarks implicitly indicate the indices of other versions of the watermark.

The dynamic watermark controller 438 accesses status characteristics of the camera 200 and determines watermark redundancy based on the status characteristics. The dynamic watermark controller 438 controls the watermark generator 432. Watermark redundancy refers to the number of copies of a watermark generated and embedded in a given image. Status characteristics include transmission characteristics (e.g., data transmission rate, signal-to-noise ratio, network connection type), processing characteristics (e.g., throughput rate), and power characteristics (e.g., remaining battery power). In response to unfavorable transmission characteristics (e.g., bandwidth less than a threshold, unreliable connection type), the dynamic watermark controller 438 increases watermark redundancy. In response to unfavorable processing or power characteristics (e.g., available processing throughput less than a threshold, available battery less than a threshold), the dynamic watermark controller 438 decreases watermark redundancy.

The inverse transform engine 440 accesses modified image coefficients from the watermark embedding module 430, converts the modified image coefficients from the frequency domain to the spatial domain, and outputs modified image data. In some embodiments, the inverse transform engine 440 applies an inverse of the transform used by the transform engine 420 (e.g., the inverse discrete Fourier transform, the inverse discrete Fourier transform, the inverse wavelet transform), though in other embodiments, the inverse transform engine 440 applies one or more different transforms to generate modified image data.

The compression engine 450 applies one or more compression processes to output compressed image data. The compression engine 450 can compress the modified image data or the modified image coefficients. For example, the compression engine 450 applies a compression algorithm based on JPEG, JPEG2000, VC-5, or H.264. In one embodiment, the compression algorithm determines coefficients in a frequency domain, quantizes the coefficients (e.g., dividing by a constant or a quantization matrix and rounding the result), and then encodes the resulting non-zero coefficients (e.g., using differential pulse code modulation or entropy coding). The compression engine 450 may include additional techniques such as dividing the image data into macroblocks for more efficient processing. The compression engine 450 may directly use the modified image coefficients from the watermark embedding module 430 to beneficially avoid the computational cost of transforming the modified image data to the frequency domain before compression. Alternatively, the compression engine 450 computes the coefficients in the frequency domain and applies a compression algorithm relying on a different transform than is used to embed the watermark.

The watermark extractor 460 accesses watermarked image data, extracts watermark coefficients, and outputs watermark data corresponding to the extracted watermark coefficients. If the watermarked image data is compressed, the watermark extractor 460 may include a decoder to convert the compressed image data into the watermarked image data. The extracted watermark coefficients are obtained from a frequency domain representation of the modified image data (e.g., determined using the transform engine 420). The watermark extractor 460 applies an inverse of the process used to embed the watermark. For example, the watermark extractor 460 extracts the watermark coefficients from the image coefficients obtained from the transform engine 420 using a watermark position indicator associated with the compressed image data. The watermark extractor then determines the watermark data from the extracted watermark coefficients. For example, if the watermark generator 432 generates the watermark coefficients by applying halftone dithering with pseudorandom noise, the watermark extractor 460 determines the pseudorandom noise used in the dithering from a pseudorandom noise seed associated with the obtained image data. Continuing this example, to obtain the original watermark data (or an approximation thereof), the watermark extractor 460 reverses the dithering by extracting the pseudorandom noise to obtain the watermark data. Alternatively to extracting the pseudorandom noise, the watermark extractor 460 extracts the watermark data by applying a matched filter based on the same pseudorandom noise used to embed the watermark coefficients. Using a matched filter beneficially reduces the processing time to extract the watermark and can simultaneously provide the watermark coefficients to multiple processes using data encoded in the watermark coefficients.

In some embodiments, the watermark embedding module 430 embeds multiple versions of a watermark in the image. In such embodiments, the watermark extractor 460 extracts image coefficients corresponding to each version of the watermark. The watermark determines the watermark data corresponding to each version of the watermark. For example, if different pseudorandom noise matrices are used to generate the different versions, then the watermark extractor 460 determines the pseudorandom noise matrices corresponding to each version of the embedded watermark and applies an inverse operation to remove the dithering effect. The pseudorandom noise matrices may be generated from pseudorandom noise seeds associated with the accessed image data. If the multiple versions of the watermarks were embedded as identical copies, the watermark extractor 460 applies a measure of central tendency (e.g., an average, a median) to the watermark coefficients. In some embodiments, the watermark embedding module 430 embeds multiple different watermarks within an image (for instance, a first watermark corresponding to a low-resolution version of the image and a second watermark corresponding to camera calibration information associated with the capture of the image). In some embodiments, the watermark embedding module 430 embeds any combination of watermarks described herein within an image.

The watermark extractor 460 may use the watermark coefficients to generate an approximation of the original image data. For example, the approximation is generated from truncated bit data, high-frequency components, or low-resolution versions of an image embedded as a watermark. The watermark extractor 460 may also output camera calibration information or feature sets for use in subsequent image processing. The watermark extractor 460 is described further with respect to FIG. 5*b*.

Watermark Generation

FIG. 5*a* is a block diagram of the watermark generator 432, according to one embodiment. The watermark generator 432 includes a low-resolution image watermark generator 505, a truncated image data watermark generator 510, an audio watermark generator 515, a video sequence watermark generator 520, a calibration data watermark generator 525, a high-frequency watermark generator 530, a feature set watermark generator 535, and a metadata watermark generator 540. Various embodiments may have additional, omitted, or alternative modules configured to perform at least some of the described functionality.

The low-resolution image watermark generator 505 accesses image data, generates a low-resolution image from the image data, and outputs watermark coefficients representing the low-resolution image. For example, the low-resolution image has one fourth, one sixteenth, or one sixty-fourth as many pixels as the image data. In some embodiments, the low-resolution image is generated by a measure of central tendency across pixels in a contiguous region of the image data. In some embodiments, the low-resolution image watermark generator 505 applies a wavelet transform to convert the image data to image coefficients and accesses the low-resolution image from the image coefficients corresponding to the low-resolution components. For example, applying a Haar wavelet transform generates a one-quarter resolution version of the image in upper-left coefficients corresponding to low frequency components. In this example, the low-resolution image from the Haar wavelet transform is equivalent to an average across a contiguous region of pixels. In some embodiments, the low-resolution image watermark generator 505 applies a wavelet transform to the image, producing a high/high image component, a high/low image component, a low/high image component, and a low/low image component. In such embodiments, the low/low image component includes a representation of the image at one-quarter of the resolution, and the low-resolution image watermark generator 505 transforms the low/low image component into the frequency domain, using the resulting low/low image coefficients as the digital watermark. The low-resolution image watermark generator 505 outputs watermark coefficients representing the low-resolution version of the image data.

The truncated image data watermark generator 510 accesses image data represented by a plurality of data bits and generates watermark coefficients representing truncated image data bits of the plurality of data bits. In one embodiment, the compression engine 450 reduces the bit depth of the image data by truncating a number of least significant bits. For example, the image sensor 312 captures 10-bit or 12-bit image data, but the compression engine 450 truncates the image data to 8-bit data by truncating two or four least significant bits from the value of each pixel. The image data may be truncated as a result of other camera processes, including de-mosaic-ing, tone-mapping, or color conversion, for example. The truncated image data watermark generator 510 encodes at least some of the truncated image data bits as watermark coefficients. In one embodiment, the truncated image data watermark generator generates watermark coefficients representing least significant bits from a low-resolution version of the image data, as obtained by low-resolution image watermark generator 505. The truncated image data watermark generator 510 is described further in conjunction with FIGS. 6*a* and 6*b*.

The audio watermark generator 515 accesses audio data associated with one or more images and generates watermark coefficients representing portions of the audio data. In some embodiments, the image sensor 312 captures successive video frames while the one or more microphones 212 capture audio data. The audio watermark generator 515 identifies audio data portions corresponding to each image frame. For example, if the video frames are captured at 15 frames per second (fps), then 5 channels of 40 kHz audio may be encoded as watermarks, and watermark coefficients corresponding to the watermarks can be embedded in the video frames. The audio data (or portions thereof) can be compressed using lossy or lossless techniques. The audio watermark generator 515 outputs watermark coefficients representing the audio data or the compressed audio data.

The video sequence watermark generator 520 accesses image data and generates watermark coefficients representing a low-resolution version of image data corresponding to a reference frame (also referred to as an intra frame or an i-frame) or an inter frame such as a predicted frame (p-frame) or a bidirectional predicted frame (b-frame). The watermark is then embedded in a temporally proximate frame. Typically, the temporally proximate frame with the embedded watermark is a reference frame because reference frames are stored using more data and accordingly may be imperceptibly watermarked with more data. Often, the temporally proximate frame is in the same group of pictures as the frame in the watermark. For example, a low-resolution version of a p-frame is embedded as a watermark in a previous i-frame. If the p-frame is lost or degraded (e.g., a portion is lost), then the p-frame watermark in the i-frame enables reconstruction of the p-frame. As another example, a low-resolution version of an i-frame is embedded in another i-frame. Techniques for generating the low-resolution image are described further with respect to the low-resolution image watermark generator 505 and FIGS. 6*a* and 6*b*.

The calibration data watermark generator 525 accesses calibration data describing characteristics of a camera capturing an image and generates watermark coefficients representing the calibration data. Calibration data describes parameters affecting image capture. Calibration data includes image sensor settings such as image resolution, video frame rate, ambient light conditions, spectral calibration, photometric calibration, lens apparatus configuration (e.g., optical zoom level, pointing errors), or a combination thereof. For a system with multiple image sensors (e.g., a stereoscopic camera, an array of cameras), calibration data can include synchronization information (e.g., relative positions, orientations, image capture settings). For example, the calibration data can include pixel shift or delay time information to eliminate artifacts due to rolling shutter effects. As another example, the calibration data can indicate portions of image data taken from one image sensor corresponding to an overlapping field of view with another image sensor. Embedding calibration data in images beneficially reduces transmission bandwidth to transmit the calibration data. In particular, as the number of cameras in an array increases linearly, the number of camera pairs with potentially overlapping fields of view increases at a quadratic rate. Thus, embedding calibration data saves increasingly more transmission bandwidth as the number of cameras increases. The calibration data watermark generator 525 outputs watermark coefficients representing the calibration data.

The high-frequency watermark generator 530 accesses image data, generates high-frequency coefficients from the image data, and outputs watermark coefficients representing the high-frequency coefficients. In one embodiment, the high frequency watermark generator 530 accesses image coefficients from the transform engine 420 and selects high-frequency coefficients from the frequency domain. The high-frequency coefficients typically correspond to information coefficients that would be discarded or distorted during image compression. In one embodiment, the high-frequency watermark generator 530 converts the image data using a wavelet transform. For example, the high-frequency watermark generator 530 selects high-low and low-high frequency coefficients, which correspond to a high frequency in one direction and low frequency in another direction. These frequency coefficients indicate horizontal and vertical edges in the image data. As another example, the high-frequency watermark generator 530 selects high-high frequency coefficients (corresponding to high frequencies in both directions), which indicate localized features in the image data. The high-frequency watermark generator 530 outputs watermark coefficients representing the high-frequency data.

The feature set watermark generator 535 accesses feature sets describing image data and generates watermark coefficients representing the feature sets. Feature sets describe the content of image data. In one embodiment, the sensor corrector 410 determines feature sets such as noise characteristics, regions of interest in the image, or edges in the image. Feature sets may include stereoscopic information indicating depth determined for different regions of an image. Noise characteristics include one or more signal-to-noise ratios corresponding to an image. Regions of interest include objects recognized using image processing (e.g., the horizon, faces). For example, regions of interest are determined based on luminance and color channels in the image. Feature sets may describe lens characteristics resulting in effects that vary across different pixel regions of an image. Example feature sets include a distortion profile for the lens 202 (e.g., distortion of the edges of an image due to a fisheye effect, chromatic aberration data (e.g., variation of lens light levels in the corners of a wide-angle lens 202) and a lens shading profile, which may be obtained from the sensor corrector 410. Other example feature sets include camera manufacturing and diagnostic parameters such as exposure characteristics of the image, thermal performance (e.g., thermal expansion coefficient) of the image sensor 312 and lens 202, and tip/tilt and axial-offsets of the lens assembly.

The metadata watermark generator 540 accesses metadata associated with image data and generates watermark coefficients representing the metadata. Metadata includes information about image data itself, a video including the image data, the camera 200 used to capture the image data, the environment or setting in which image data is captured or any other information associated with the capture of the image data. For example, metadata can include acceleration data representative of the acceleration of a camera 200 attached to a user as the user captures a video while snowboarding down a mountain. Metadata sources may be included in the camera 200 or communicatively coupled to the camera 200. In one embodiment, metadata associated with image data are encoded as an array, where different types of metadata are encoded in particular locations according to a standard format.

Examples of metadata include: telemetry data (e.g., motion data, velocity data, acceleration data) captured by sensors in the camera 200 or a device (e.g., a smartphone) communicatively coupled therewith; location information captured by a GPS receiver or other location sensor; compass heading information; altitude information; biometric data such as the heart rate of the user, respiration rate of the user, eye movement of the user, body movement of the user, and the like; vehicle data such as the velocity or acceleration of the vehicle, the brake pressure of the vehicle, or the rotations per minute (RPM) of the vehicle engine; or environment data such as the weather information associated with the capture of the video. Metadata may be captured concurrently with the image data or obtained from the system memory 304 or synchronization interface 306, for example.

Watermark Extraction

FIG. 5*b* is a block diagram of the watermark extractor 460, according to one embodiment. The watermark extractor includes a preview image generator 555, an image enhancer 560, an audio extractor 565, a video decoder 570, a camera calibrator 575, an edge extractor 580, a feature set extractor 585, and a metadata extractor 590. Various embodiments may have additional, omitted, or alternative modules configured to perform at least some of the described functionality.

The preview image generator 555 accesses an image with an embedded watermark representing a low-resolution version of an image and extracts the low-resolution version of the image. The low-resolution version of the image is embedded as a watermark in the frequency domain of the image. For example, the watermark is generated by the low-resolution image watermark generator 505. In one embodiment, the preview image generator 555 extracts the low-resolution image by transforming the accessed image to the frequency domain (e.g., using the transform engine 420), extracting watermark coefficients from the image coefficients in the frequency domain, and decoding the watermark coefficients to recover the low-resolution version of the image. The low-resolution image may be beneficially used as a preview thumbnail representing the image, which beneficially improves the quality of the preview thumbnail compared to generating the preview thumbnail from the full-resolution image. For example, the display 218 displays the preview thumbnail of an image obtained from the preview image generator 555. As another example, the camera 200 is controlled by a mobile device, which uses the preview thumbnail in an interface displaying images on the system memory 304 of the camera 200.

The image enhancer 560 accesses an image with an embedded watermark representing truncated image data bits and generates an approximation of the original image using the truncated image data bits. The truncated data bits are embedded as a watermark in the frequency domain of the image. For example, the watermark is generated by the truncated image data watermark generator 510. In one embodiment, the image enhancer 560 extracts the truncated image data bits by transforming the image to the frequency domain (e.g., using the transform engine 420), extracting watermark coefficients from the image coefficients in the frequency domain (e.g., using a matched filter), and decoding the watermark coefficients to recover the truncated image data bits. For example, the approximation of the original image data has a bit depth of 8 bits per pixel per color channel. The image enhancer 560 combines the truncated image data bits with the approximation of the original image data to generate an enhanced approximation of the original image data. For example, the truncated image data represents the 2 to 4 least significant image data bits from the original image data bits, so the enhanced approximation of the original image data has 10 to 12 bits per pixel per color channel. As another example, the original image data has 14 to 16 bits per pixel per color channel, and the truncated image data represents 4 to 8 least significant data bits from the original image data bits.

The image enhancer 560 combines the approximation of the original image data with the truncated image data bits by appending the truncated image data bits to image data bits representing the approximation of the original image data as least significant bits. Since the truncated image data bits in the watermark correspond to fewer pixels than the approximation of the original image data, the image enhancer 560 may duplicate the truncated image data bits into contiguous regions corresponding to the pixels of the approximation of the original image data. The image enhancer 560 may apply a moderate smoothing effect over regions of the enhanced image having no edges. For example, a Gaussian blur with dimensions on the order of the dimensions of the contiguous regions of duplicated pixels is applied to areas of the enhanced image without a corresponding edge.

The audio extractor 565 accesses video frames with embedded watermarks representing audio data portions and generates an audio file from the audio data portions. One or more audio data portions are embedded as a watermark in the frequency domain of the video frame. For example, the watermark is generated by the audio watermark generator 515. In one embodiment, the audio extractor 565 extracts an audio data portion by transforming the frame to the frequency domain (e.g., using the transform engine 420), extracting watermark coefficients from the image coefficients in the frequency domain, and decoding the watermark coefficients to recover the audio data portion associated with the video frame. If an audio data portions is compressed, the audio extractor 565 decodes the compressed audio data portion to recover the original audio data or an approximation thereof (if compressed using a lossy scheme). The audio extractor 565 combines audio data portions extracted from video frames into an audio file associated with the video frames. In some embodiments, the audio file is synchronized to the video frame according to a standard synchronization scheme. For example, a video frame corresponds to the beginning of the associated audio data portion. Thus, a replay of the video presents the beginning of an audio data portion corresponding to a video frame as the video frame is presented.

The video decoder 570 accesses video frames with embedded watermarks representing low-resolution versions of temporally proximate video frames and generates approximations of the temporally proximate video frames from the embedded low-resolution versions. A low-resolution version of a temporally proximate video frame is embedded as a watermark in the frequency domain of the video frame. For example, the watermark is generated by the video sequence watermark generator 520. In one embodiment, the video decoder 570 extracts a temporally proximate video frame by transforming the frame to the frequency domain (e.g., using the transform engine 420), extracting watermark coefficients from the image coefficients in the frequency domain, and converting the watermark coefficients into a low-resolution version of the video frame. A first approximation of the temporally proximate video frame is generated based on the obtained video frame and motion vectors. The motion vectors describe a change in the image data between the obtained frame and the temporally proximate frame. The motion vectors may include a global motion vector or localized motion vectors applying to pixels or regions of pixels in the image data. The video decoder 570 can generate the low-resolution version of the temporally proximate video frame in response to determining that the temporally proximate video frame is missing, is missing portions, or is otherwise degraded.

The camera calibrator 575 accesses an image with an embedded watermark representing calibration data about the camera capturing the image and determines the calibration data embedded therein. Calibration data is embedded as a watermark in the frequency domain of an image. For example, the watermark is generated by the calibration data watermark generator 525. In one embodiment, the camera calibrator 575 extracts the calibration data by transforming the image to the frequency domain (e.g., using the transform engine 420), extracting watermark coefficients from the image coefficients in the frequency domain, and converting the watermark coefficients into the calibration data based on the encoding pattern used by the calibration data watermark generator 525. Calibration data indicating synchronization information can be used to adjust image sensor settings for subsequent image capture. For example, the calibration data include image sensor settings of a slave camera. A master camera determines adjusted image sensor settings (e.g., to synchronize image capture) and commands the slave camera to use the adjusted image sensor settings. Calibration data indicating image settings can facilitate further image processing. For example, position, orientation, and zoom level of image sensors with an overlapping field of view are used to stitch together images taken by the image sensors. As another example, image sensor settings indicating exposure time or flash settings may be used to adjust colors in an image.

The edge extractor 580 accesses an image with an embedded watermark representing high-frequency coefficients from the image data and extracts the high-frequency coefficients. High-frequency coefficients are embedded as a watermark in the frequency domain of an image. For example, the watermark is generated by the high-frequency watermark generator 530. In one embodiment, the edge extractor 580 extracts the high-frequency coefficients by transforming the image to the frequency domain (e.g., using the transform engine 420), extracting watermark coefficients from the image coefficients in the frequency domain, and converting the watermark coefficients into the high-frequency coefficients based on the encoding pattern used by the high-frequency watermark generator 530. Edge information (e.g., from high-low and low-high coefficients) in the high-frequency coefficients may facilitate further image processing. For example, horizontal edges may be used to synchronize rolling shutters in a multi-image sensor system, or may be used to detect the horizon.

The edge extractor 580 generates enhanced approximations of original image data using the high-frequency components. The edge extractor 580 accesses modified image coefficients of the image (e.g., using the transform engine 420) and extracts watermark coefficients corresponding to the embedded watermark from the modified image coefficients. The edge extractor 580 may also extract image coefficients corresponding to the original image data, or use the modified image coefficients to approximate the original image data. The edge extractor 580 can generate an approximation of the original image data from the image coefficients (e.g., using the inverse transform engine 440). The edge extractor 580 can also modify the image coefficients by replacing (or modifying) image coefficients corresponding to high-frequency components with the high-frequency coefficients determined from the watermarked image coefficients. These image coefficients incorporating the high-frequency coefficients are then converted to the spatial domain (e.g., using the inverse transform engine 440) to generate an enhanced approximation of the original image data. For example, if the high-frequency components include edges (e.g., high-low coefficients or low-high coefficients), then the enhanced approximation of the original image data has sharper, more precise edges than those in the initial approximation of the original image data.

The feature set extractor 585 accesses an image with an embedded watermark representing feature sets and extracts the feature sets. One or more feature sets are embedded as a watermark in the frequency domain of an image. For example, the watermark is generated by the feature set watermark generator 535. In one embodiment, the feature set extractor 585 extracts a feature set by transforming the image to the frequency domain (e.g., using the transform engine 420), extracting watermark coefficients from the image coefficients in the frequency domain, and converting the watermark coefficients into the feature set based on the encoding pattern used by the feature set watermark generator 535. For image data received from a multi-camera system, feature sets can describe stereoscopic information or boundaries between a shared field of view. The boundaries demarcating the shared field of view facilitate stitching the images together. The stereoscopic information indicating depth of different pixels may be used to generate three-dimensional images. Manufacturing and diagnostic parameters in feature sets can be used to correct image sensor alignment in a multi-camera system. As another example, the feature sets may facilitate automatic editing of images or videos. For example, the feature set extractor 585 uses a feature set indicating which pixels correspond to an object of interest (e.g., a face, a person) to automatically crop video frames to maintain focus on the face or person. As another example, sharpness of objects in a region of interest is maximized at the expense of blurring backgrounds outside the region of interest. As another example, the feature set extractor 585 automatically crops out regions of an image with fisheye effects based on a feature set including a lens distortion profile indicating which pixels are noticeably distorted by the fisheye effect.

The metadata extractor 590 accesses an image with an embedded watermark encoding metadata and extracts the metadata. One or more types of metadata are embedded as a watermark in the frequency domain of an image. For example, the watermark is generated by the metadata watermark generator 540. In one embodiment, the metadata extractor 590 extracts metadata by transforming the image to the frequency domain (e.g., using the transform engine 420), extracting watermark coefficients from the image coefficients in the frequency domain, and converting the watermark coefficients into the metadata based on the encoding pattern used by the metadata watermark generator 540. Metadata may be used for various applications such as facilitating image or video editing and organizing image data. Activity of a user capturing the image data may be inferred based on metadata and used to organize image data. For instance, metadata indicating twenty-mile-per-hour speeds, twenty-degree temperatures, and ten-thousand-feet elevation indicate a user is skiing or snowboarding. High-excitement images or portions of a video may be identified from metadata, which can be used to facilitate image editing by highlighting these high-excitement images or video portions. For example, acceleration metadata exceeding a threshold indicates a crash, which is a high-excitement moment a user may wish to share with friends.

Truncated Image Data Selection

Figure 6A:
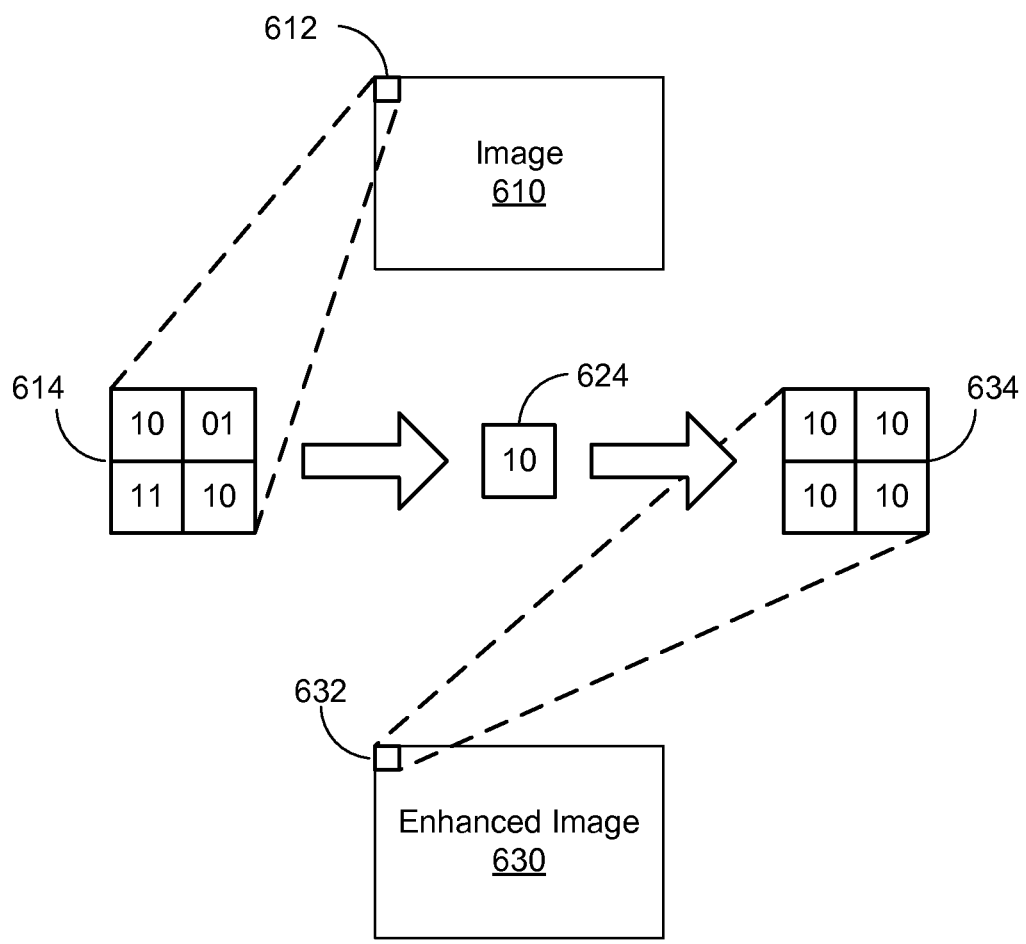
FIG. 6a is a conceptual diagram illustrating watermark generation using averages of truncated image data bits, according to one embodiment.

FIG. 6a is a conceptual diagram illustrating watermark generation using averages of truncated image data bits, according to one embodiment. An image 610 includes pixels, including the pixel region 612 of four contiguous pixels. The example image includes image data of bit depth N, which a compression algorithm truncates to a bit depth of N−2. The truncated image data bits 614 are the 2 least significant bits of each pixel in the pixel region 612. In one embodiment, the truncated image data watermark generator 510 averages the truncated image data bits 614 to determine the representative truncated image data bits 624. The watermark generator 432 encodes the truncated image data bits 624 representing the pixel region 612 with other truncated image data bits representing other pixels regions as watermark coefficients. The watermark embedding module 430 embeds the corresponding watermark into the image 610, which the compression engine 450 subsequently compresses.

A watermark extractor 460 determines the watermark coefficients from the compressed image and decodes the representative truncated image data bit 624 from the watermark coefficients. The image enhancer 560 duplicates the representative truncated image data bits 624 into duplicate truncated image data bits 634, which correspond to a pixel region 632 occupying the same portion of the enhanced image 630 as the pixel region 612 occupies in the image 610. The watermark extractor 460 generates an initial approximation of the image 610 from image coefficients. To generate the enhanced image 630 (which is an enhanced approximation of the image 610), the image enhancer 560 appends the duplicated truncated image data bits 634 as the least significant bits to the image data bits in the initial approximation of the image 610.

Figure 6B:
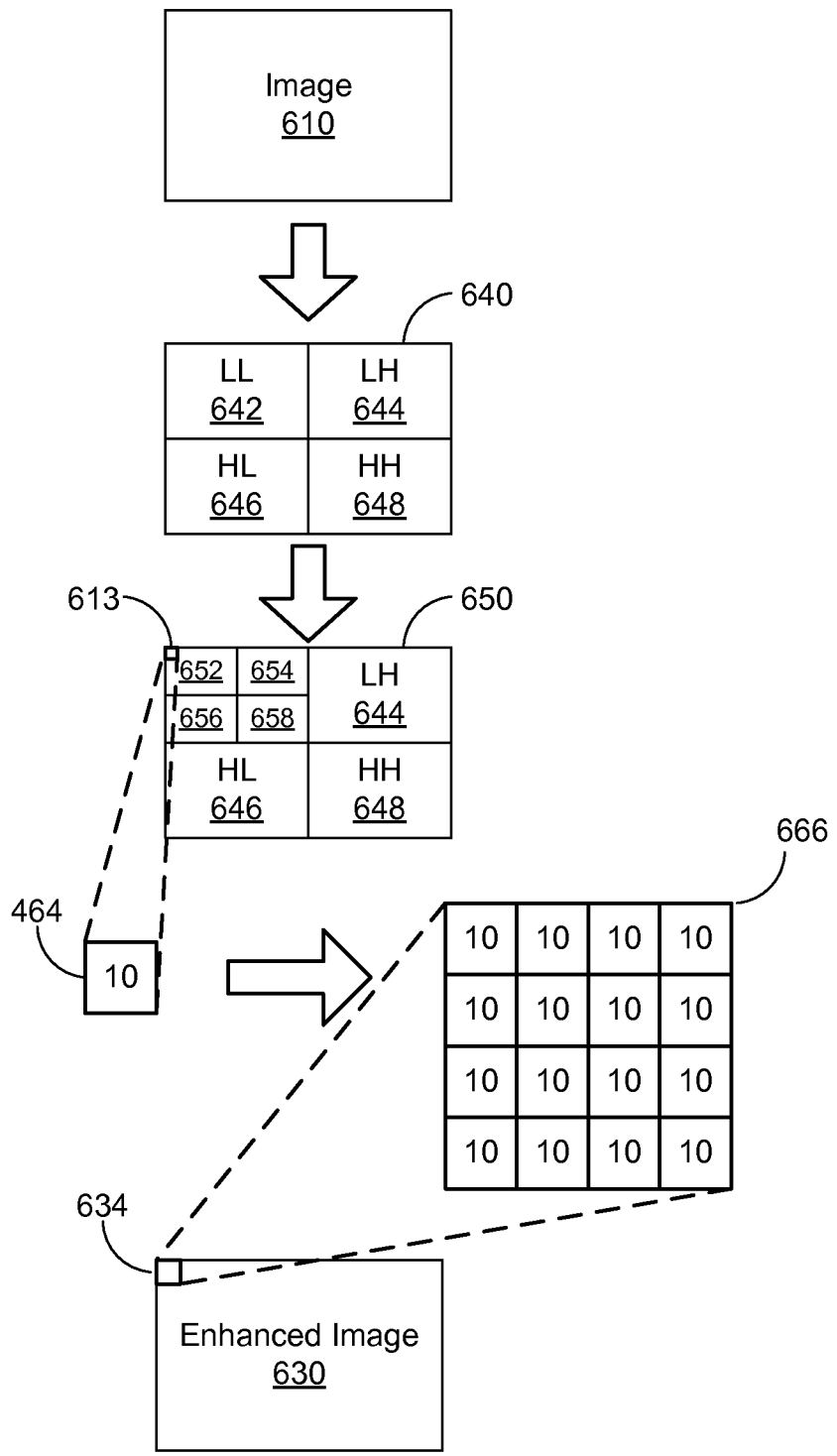
FIG. 6b is a conceptual diagram illustrating watermark generation using a wavelet transform of image data, according to one embodiment.

FIG. 6b is a conceptual diagram illustrating watermark generation using a wavelet transform of image data, according to one embodiment. The image 610 includes an array of pixels. The low-resolution image watermark generator 505 determines first-level image coefficients 640 by applying a wavelet transform to the image 610. The first-level coefficients include low-low (LL) coefficients 642 corresponding to a local average of pixel regions. In this case, image data in a two-by-two pixel region is averaged to produce a representative pixel. The first level transform also includes low-high (LH) coefficients 644, high-low (HL) coefficients 646, and high-high (HH) coefficients 648, which correspond to vertical edges, horizontal edges, and point features, respectively.

The low-resolution image watermark generator 505 applies another wavelet transform to the LL coefficients 642 to generate the second-level image coefficients 650. In the second-level image coefficients, further LL coefficients 652, LH coefficients 654, HL coefficients 656, and HH coefficients 658 coefficients replace the LL coefficients 642. The LL coefficients 652 represent a local average of pixel regions in the LL coefficients 642. Accordingly, the image data for the pixel 613 represents an average of a four pixel-by-four pixel region of the LL coefficients 652. The truncated image data watermark generator 510 generates the representative data bits 464 from the 2 least significant bits (or the 2 most significant data bits that are truncated by compression) of the image data for pixel 613. The watermark generator 432 encodes the representative data bits 464 with other representative data bits corresponding to other pixels as watermark coefficients. The watermark embedding module 430 embeds the corresponding watermark into the image 610, which the compression engine 450 subsequently compresses.

The watermark extractor 460 determines the watermark coefficients from the compressed image and decodes the representative data bits 464 from the watermark coefficients. The image enhancer 560 duplicates the representative data bits 464 into duplicate truncated image data bits 666, which correspond to a pixel region 634 occupying a portion of the enhanced image 630 corresponding to the position of the pixel 613 in the second-level image coefficients 650. The watermark extractor 460 generates an initial approximation of the image 610 from the image coefficients. To generate the enhanced image 630 (which is an enhanced approximation of the image 610), the image enhancer 560 appends the duplicated truncated image data bits 666 as the least significant bits to the image data bits in the initial approximation of the image 610.

Video Frame Reconstruction

Figure 7:
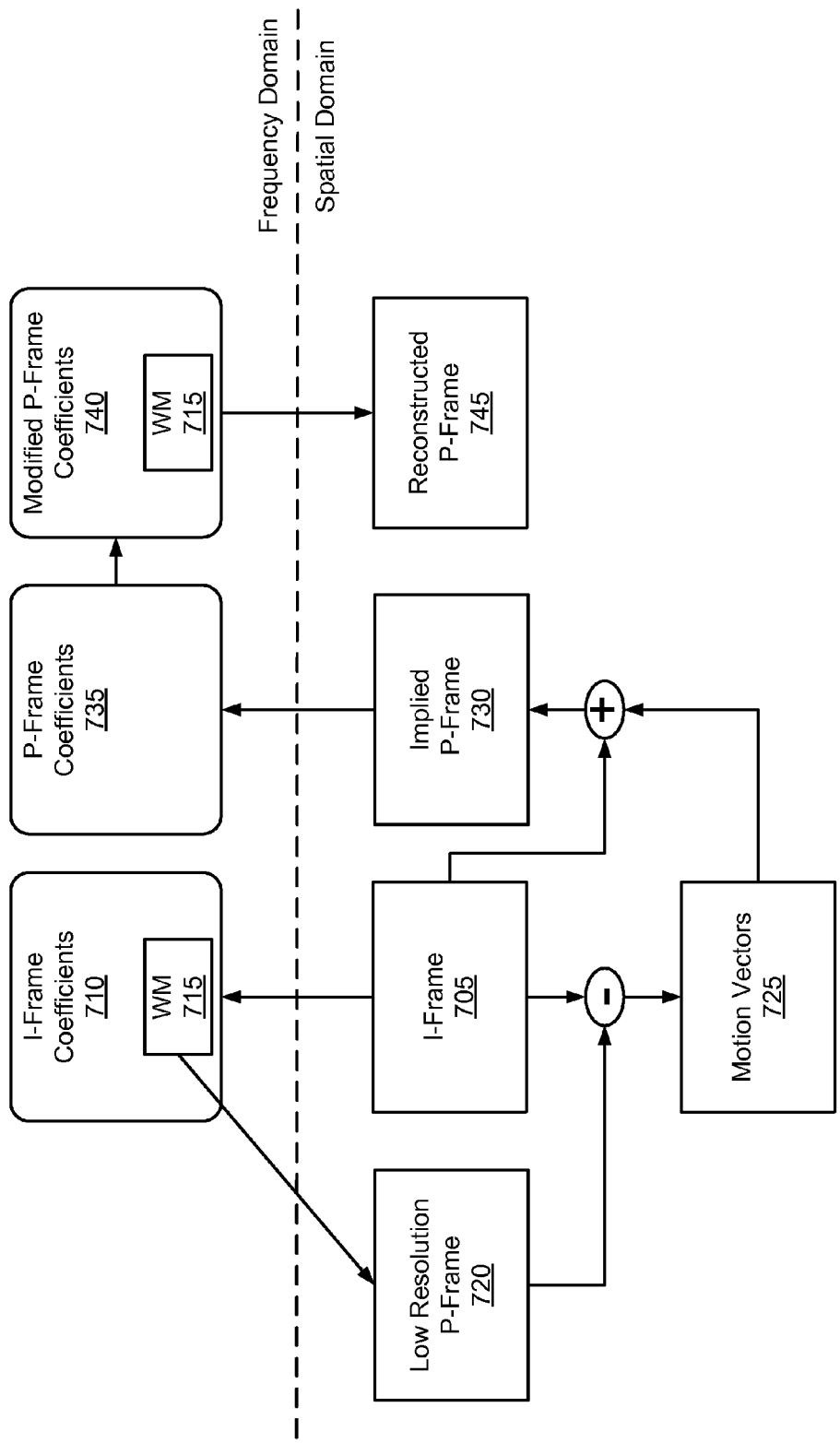
FIG. 7 is a conceptual diagram illustrating reconstruction of a video frame using a watermark embedded in another video frame, according to one embodiment.

FIG. 7 is a conceptual diagram illustrating reconstruction of a video frame using a watermark embedded in another video frame, according to one embodiment. A reference frame (i-frame) 705 is accessed with an embedded watermark of an inter frame (such as a p-frame). The embedded watermark corresponds to a low-resolution version of the p-frame rather than as an inter frame dependent on the i-frame. The p-frame is to be reconstructed due to loss of the p-frame or portions thereof. The transform engine 420 converts the i-frame 705 into i-frame coefficients 710 (e.g., using the fast cosine transform). The watermark extractor 460 extracts the watermark coefficients (WM) 715 from the i-frame coefficients 710. The watermark extractor 460 converts the watermark coefficients 715 into a low-resolution p-frame, which is an approximation of the p-frame. By comparing the low-resolution p-frame 720 and the i-frame 705, the video decoder 570 determines the motion vectors 725. Alternatively or additionally, the motion vectors are obtained from metadata associated with the video or from another watermark embedded in the i-frame 705.

Using the motion vectors 725 and the i-frame 705, the video decoder 570 determines an implied p-frame 730 that approximates the original p-frame at higher resolution. The video decoder 570 converts the implied p-frame 730 to the frequency domain using the transform engine 420 to generate the p-frame coefficients 735. The video decoder 570 replaces the p-frame coefficients corresponding to low frequencies with the watermark coefficients 715 to generate the modified p-frame coefficients 740. This implementation assumes that the watermark coefficients 715 correspond directly to the low-frequency coefficients of the image data corresponding to the p-frame. Alternatively or additionally, the video decoder 570 determines the low-frequency coefficients of the image data corresponding to the p-frame from the watermark coefficients 715. The inverse transform engine 440 converts the modified p-frame coefficients 740 from the frequency domain to the spatial domain (e.g., using the inverse fast cosine transform) to generate the reconstructed p-frame. Replacing low-frequency components of the p-frame coefficients with those derived from the watermark coefficients beneficially improves accuracy of the reconstructed p-frame 745.

Although described with respect to video frames, the method may apply to slices (e.g., i-slices, p-slices) or macroblocks (e.g., as in H.264/MPEG-4 AVC) instead of video frames. Although FIG. 7 describes reconstructing a p-frame using an i-frame, other permutations are possible. For example, an i-frame embedded in another i-frame (e.g., an i-frame in a temporally adjacent group of pictures) may be reconstructed using the low-resolution version embedded in the other i-frame's watermark.

In one embodiment, an inter frame (e.g., a p-frame, a b-frame) includes an embedded low-resolution version of an i-frame temporally proximate to the inter frame. If the inter frame's reference i-frame is lost or degraded, then an approximation of the i-frame may be recovered using the low-resolution version of the i-frame embedded as a watermark in the inter frame. For example, the low-resolution version of the i-frame is recovered by extracting the watermark coefficients from a frequency domain representation of the inter frame and converting the watermark coefficients to the low-resolution version of the i-frame. Once an approximation of the i-frame is recovered, an approximation of the inter frame may be rendered using motion vectors of the inter frame relative to the recovered approximation of the i-frame.

Compressing An Image

Figure 8:
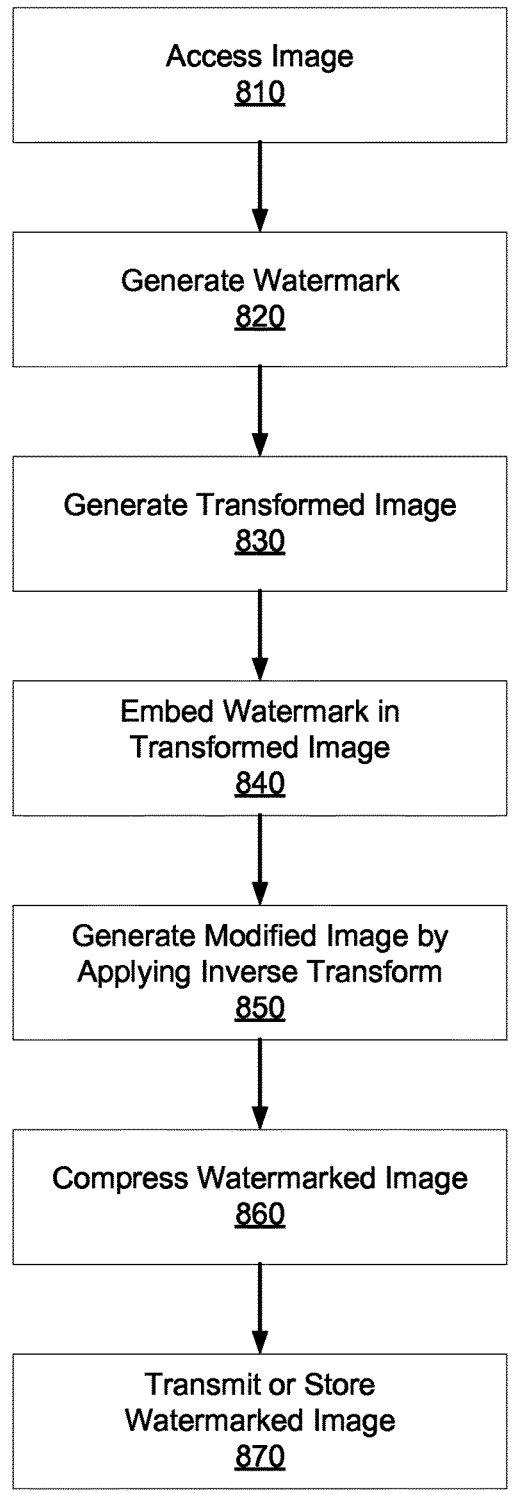
FIG. 8 is a flow diagram illustrating a process for compressing an image, according to one embodiment.

FIG. 8 is a flow diagram illustrating a process for compressing an image, according to one embodiment. The watermark embedding module 430 accesses 810 an image made up of pixels having image data. In some embodiments, the sensor corrector 410 applies a sensor correction to the image prior to embedding the watermark in the transformed image.

The watermark generator 432 generates 820 watermark coefficients representing watermark data. For example, the watermark data represents truncated pixels from one or more color channels of an image, a low-resolution version of an image, an audio data portion associated with a video frame, a video frames temporally proximate to a video frame, calibration data, feature sets, high-frequency coefficients, or other data associated with an image as described above.

The transform engine 420 generates 830 a transformed image by converting the image data into a set of image coefficients in the frequency domain. The transform engine 420 may determine the set of image coefficients representative of the frequencies of the image, for example, by applying a linear transform.

The watermark embedding module 430 embeds 840 the watermark in the transformed image by modifying a subset of the image coefficients based on the set of watermark coefficients to form a modified set of coefficients. The watermark placement module 436 may select a subset of coefficients from the image coefficients into which the watermark coefficients are to be embedded, for instance image coefficients associated with energy less than a threshold energy. The watermark embedding module 430 may embed 840 a plurality of copies of the watermark into the transformed image by modifying subsets of the image coefficients with one or more versions of the set of watermark coefficients.

The inverse transform engine 440 generates 850 a modified image by converting the modified set of coefficients into watermarked image data in a spatial domain. The inverse transform engine 440 may determine the watermarked image data by applying an inverse of the linear transform applied by the transform engine 420. The compression engine 450 compresses 860 the modified image to produce a compressed image. The camera 200 can store or transmit 870 the compressed image.

Enhancing An Image

Figure 9:
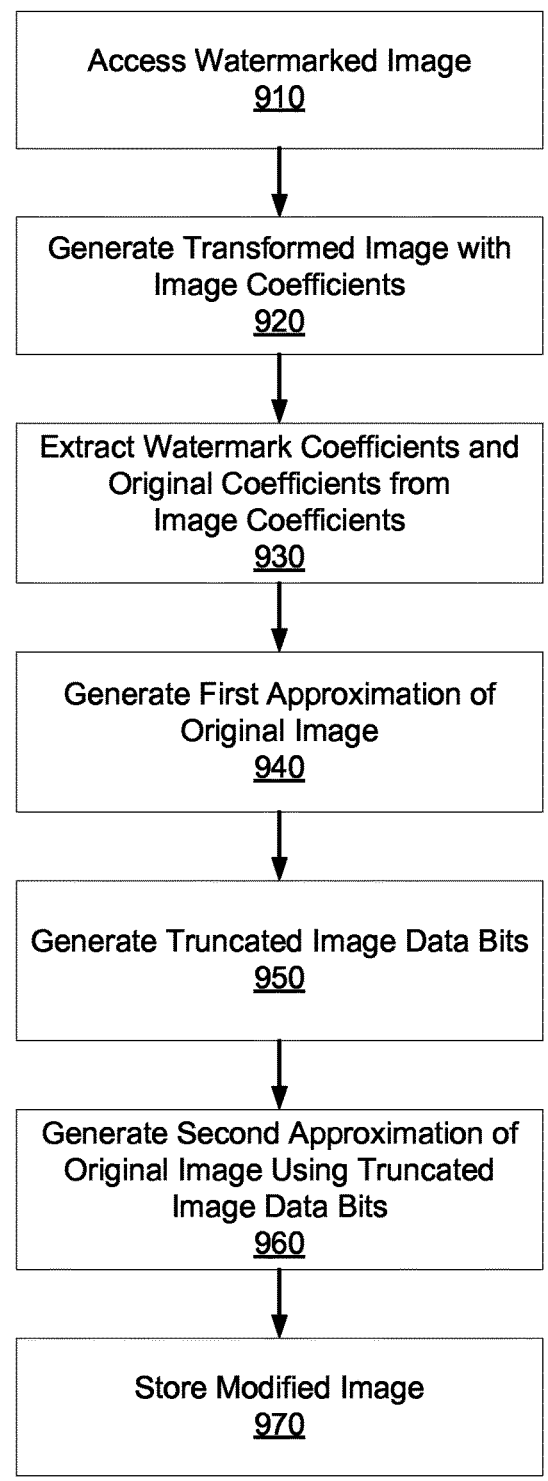
FIG. 9 is a flow diagram of a process for modifying an image using maintained truncated image data bits, according to one embodiment.

FIG. 9 is a flow diagram of a process for modifying an image using maintained truncated image data bits, according to one embodiment. The watermark extractor 460 accesses 910 a modified image comprising an array of pixels. Each pixel includes image data represented by image data bits.

The modified image includes a watermark representative of least significant image data bits truncated from pixels of an original image comprising image data represented by image data bits having greater bit depth than the image data bits in the accessed image. The transform engine 420 generates 920 a transformed image by converting the modified image into a set of modified image coefficients in a frequency domain.

From the set of modified image coefficients, the watermark extractor 460 extracts 930 a set of watermark coefficients representative of the watermark and a set of original coefficients representative of the original image. To extract 930 the modified image coefficients, the watermark extractor 460 accesses a watermark position indicator specifying locations of the set of watermark coefficients among the set of image coefficients. The watermark extractor 460 extracts the set of watermark coefficients from modified image coefficients at the specified locations among the set of modified image coefficients. The set of watermark coefficients may be read from the set of modified image coefficients (e.g., using a matched filter). The set of original coefficients may be determined from the set of modified image coefficients and the set of watermark coefficients. Alternatively, the set of original coefficients are not extracted, and the modified image coefficients are used in place of the set of original coefficients. As used herein, "original coefficients" may refer to the original coefficients or an approximation thereof, such as the set of modified image coefficients. In some embodiments, extracting the set of watermark coefficients includes extracting a plurality of sets of watermark coefficients representing a plurality of versions of the watermark. The watermark extractor 460 may determine the set of watermark coefficients from a measure of central tendency across the plurality of sets of watermark coefficients.

The inverse transform engine 440 generates 940 a first approximation of the original image by converting the set of original coefficients (or modified image coefficients) into approximated original image data in a spatial domain. In some embodiments, the image enhancer 560 generates 950 the least significant image data bits by converting the set of watermark coefficients into image data in a spatial domain. (In other embodiments, the watermark coefficients are not converted into the spatial domain because, for instance, the watermark coefficients represent an audio data portion, calibration data, or a feature set.) The image enhancer 560 may access averaged image bits from the set of watermark coefficients, where the averaged image bits represent an average of least significant image data bits in associated contiguous regions of the original image. The image enhancer 560 then generates 950 the least significant image data bits by duplicating the averaged image bits according to the associated contiguous regions of the original image. The image enhancer 560 generates 960 a second approximation of the original image by combining the first approximation of the original image with the generated least significant image data bits. For example, the image enhancer 560 appends each subset of least significant image data bits to the corresponding pixel of the approximated original image data. The camera 200 can store 970 or transmit the second approximation of the original image.

Reconstructing Audio Accompanying A Video

Figure 10:
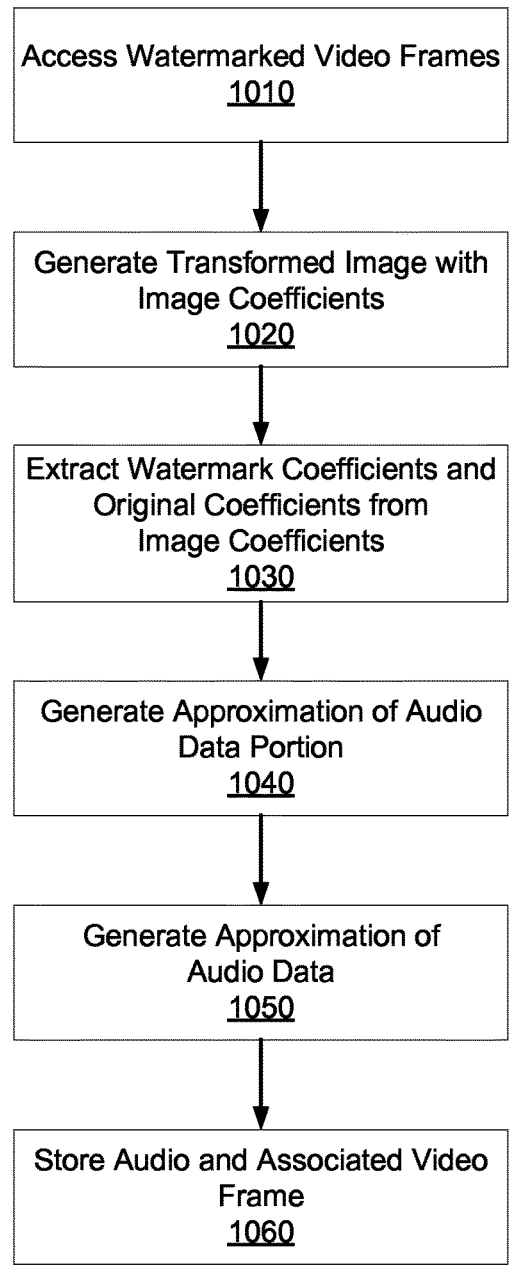
FIG. 10 is a flow diagram of a process for reconstructing a video and associated audio, according to one embodiment.

FIG. 10 is a flow diagram of a process for reconstructing a video with associated audio, according to one embodiment. The watermark extractor 460 accesses 1010 a modified video comprising a plurality of video frames each associated with a corresponding audio data portion. For each image of the plurality of video frames, the transform engine 420 generates 1020 a transformed image by converting the modified image into a set of image coefficients in a frequency domain. From the set of image coefficients, the watermark extractor 460 extracts 1030 a set of watermark coefficients representative of the watermark and a set of original coefficients representative of an original version of the image. The set of watermark coefficients may be read from the set of image coefficients (e.g., using a matched filter). The set of original coefficients may be determined from the set of image coefficients and the set of watermark coefficients. Alternatively, the set of original coefficients are not extracted, and the image coefficients are used in place of the set of original coefficients. The audio extractor 565 generates 1040 an approximation of the audio data portion associated with the image based on the set of watermark coefficients. The audio watermark extractor 565 combines the audio data portions to generate 1050 an approximation of the original audio data associated audio data.

The audio data is stored 1060 in association with the modified video. In some embodiment, the audio extractor 565 generates an approximation of the original video based on the original coefficients (or the set of watermark coefficients), and the video is stored 1060 in association with the audio. In some embodiments, the audio extractor 565 synchronizes each image or video frame to an approximation of the audio data portion identified from the watermark extracted from the image.

Reconstructing A Video Frame

Figure 11:
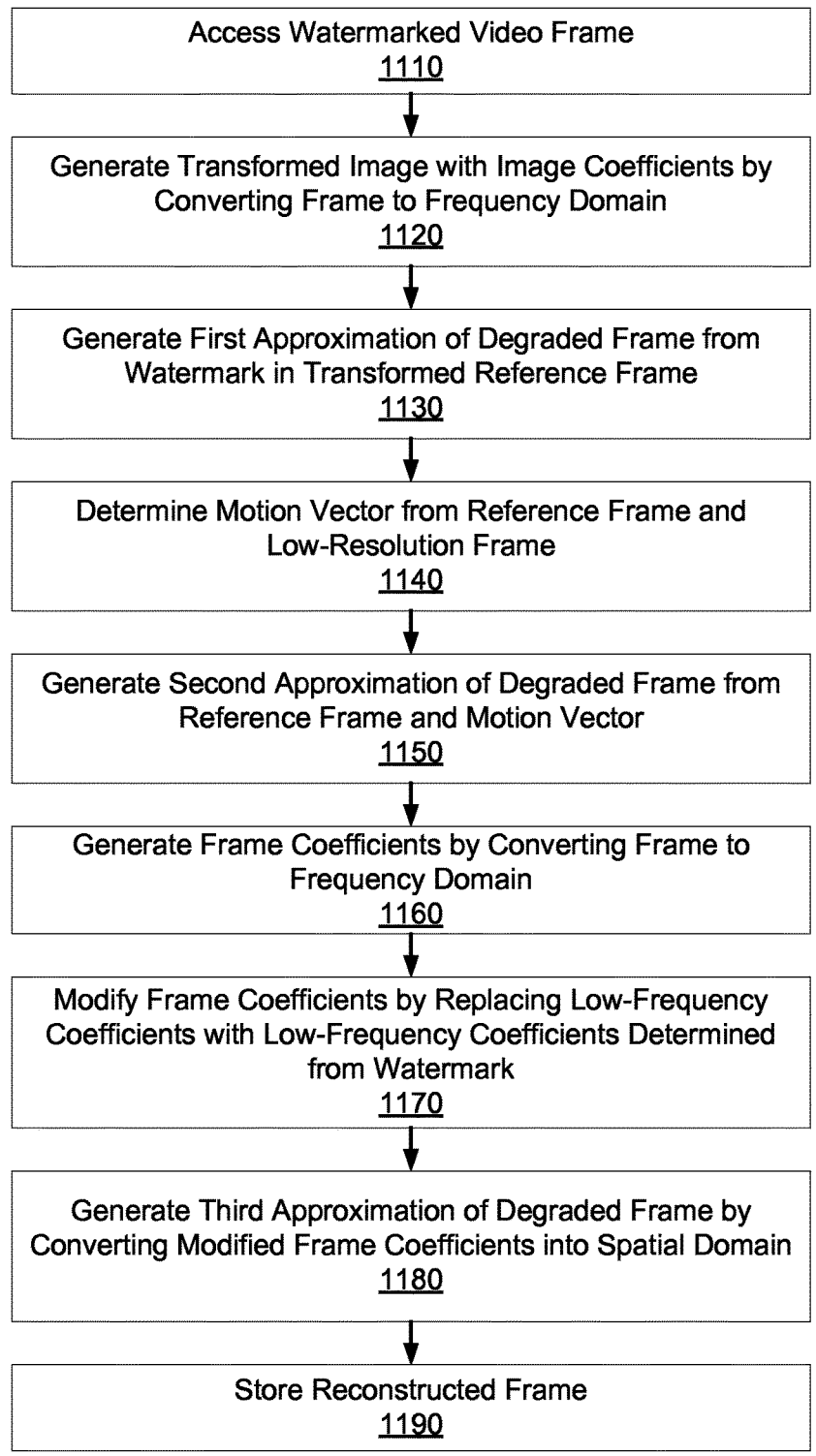
FIG. 11 is a flow diagram of a process for reconstructing a video, according to one embodiment.

FIG. 11 is a flow diagram of a process for reconstructing a video, according to one embodiment. The watermark extractor 460 accesses 1110 a modified reference video frame that is temporally proximate to a degraded video frame. The modified reference frame includes a watermark representative of a low-resolution version of the degraded frame. The transform engine 420 generates 1120 a transformed image by converting the modified reference frame into a set of image coefficients in the frequency domain. From the set of image coefficients, the watermark extractor 460 extracts a set of watermark coefficients representative of the watermark and a set of original coefficients representative of an original version of the reference frame. The set of watermark coefficients may be read from the set of image coefficients (e.g., using a matched filter). The set of original coefficients may be determined from the set of image coefficients and the set of watermark coefficients. Alternatively, the set of original coefficients are not extracted, and the image coefficients are used in place of the set of original coefficients.

The video decoder 570 generates 1130 a first approximation of the degraded frame based on the set of watermark coefficients. For example, if the watermark coefficients correspond to the low-frequency coefficients of the degraded image, then the inverse transform engine 440 converts the low-frequency coefficients into the spatial domain. The video decoder 570 determines 1140 motion vectors based on a comparison between the reference image and the first approximation of the degraded frame. The video decoder 570 generates 1150 a second approximation of degraded frame using the motion vector between the reference frame and the first approximation of the degraded frame. For example, the video decoder 570 generates the second approximation of the degraded frame by applying the motion vector to the reference frame.

The video decoder 570 generates a third approximation of the degraded frame by modifying the second approximation of the missing frame using a set of low-frequency coefficients determined from the set of watermark coefficients. In one embodiment, the transform engine 420 generates 1160 a set of reconstructed frame coefficients by converting the second approximation of the degraded image into the frequency domain. For example, the transform engine 420 applies a linear transform to the second approximation of the degraded image. The video decoder 570 identifies a subset of reconstructed frame coefficients corresponding to low-frequency coefficients and modifies 1170 the set of reconstructed frame coefficients by replacing the identified subset of reconstructed frame coefficients with the set of low-frequency coefficients determined from the watermark coefficients. The inverse transform engine 440 generates 1180 the third approximation of the degraded frame by converting the modified set of reconstructed frame coefficients into the spatial domain. For example, the inverse transform engine 440 applies an inverse of the linear transform to the modified set of reconstructed frame coefficients. The camera 200 can store 1190 or transmit the third approximation of the degraded video. For example, the third approximation replaces the degraded frame.

Additional Configuration Considerations

Certain embodiments are described herein as including logic or a number of components, modules, or mechanisms, for example, as illustrated in FIGS. 3, 4, 5a and 5b. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for watermarking image data. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for reconstructing a video frame, the method comprising:
   accessing a modified reference frame from a video, the modified reference frame temporally proximate to a degraded frame in the video, the modified reference frame including a watermark representative of a low-resolution version of the degraded frame;
   generating a transformed image frame by converting the modified reference frame into a set of image coefficients in a frequency domain;
   extracting a set of watermark coefficients representative of the watermark;
   converting the set of watermark coefficients into a first approximation of the degraded frame;
   generating a second approximation of the degraded frame using a motion vector between the modified reference frame and the first approximation of the degraded frame; and
   storing the second approximation of the degraded frame in place of the degraded frame, the storing the second approximation of the degraded frame comprising:
      generating a third approximation of the degraded frame by modifying the second approximation of the degraded frame using a set of low-frequency coefficients determined from the set of watermark coefficients, the generating of the third approximation of the degraded frame comprising:
         generating a set of reconstructed frame coefficients by converting the second approximation of the degraded image into the frequency domain;
         identifying a subset of reconstructed frame coefficients corresponding to low-frequency coefficients;
         modifying the set of reconstructed frame coefficients by replacing the subset of reconstructed frame coefficients with the set of low-frequency coefficients determined from the watermark coefficients; and
         generating the third approximation of the degraded frame by converting the modified set of reconstructed frame coefficients into the spatial domain; and
      storing the third approximation of the degraded frame in place of the degraded frame.

2. The method of claim 1, wherein the extracting of the set of watermark coefficients comprises:
   obtaining a watermark position indicator specifying locations of the set of watermark coefficients among the set of image coefficients; and
   extracting the set of watermark coefficients from coefficients at the locations among the set of image coefficients.

3. The method of claim 1, wherein the extracting of the set of watermark coefficients comprises:

extracting a plurality of versions of the watermark coefficients from the transformed image frame; and determining the set of watermark coefficients from a measure of central tendency across the plurality of versions of the watermark coefficients.

4. The method of claim 1, wherein the generating of the second approximation of the degraded frame comprises:

determining the motion vector based on a comparison between the modified reference frame and the first approximation of the degraded frame; and generating the second approximation of the degraded frame by applying the motion vector to the modified reference frame.

5. The method of claim 1, wherein:

the generating of the set of reconstructed frame coefficients comprises applying a linear transform to one or more properties of an array of pixels representing the second approximation of the degraded image; and the generating of the third approximation of the degraded frame comprises applying an inverse of the linear transform to the modified set of reconstructed frame coefficients.

6. The method of claim 1, further comprising determining the motion vector based on a comparison between the modified reference frame and the first approximation of the degraded frame;

wherein the generating of the second approximation of the degraded frame using the motion vector comprises applying the determined motion vector to the modified reference frame.

7. A non-transitory computer-readable medium comprising a computer program having a plurality of instructions for reconstructing a video frame, the plurality of instructions being executable by at least one processor apparatus to perform steps comprising:

accessing a modified reference frame from a video, the modified reference frame temporally proximate to a degraded frame in the video, the modified reference frame including a watermark representative of a low-resolution version of the degraded frame;

generating a transformed image frame by converting the modified reference frame into a set of image coefficients in a frequency domain;

extracting a set of watermark coefficients representative of the watermark;

converting the set of watermark coefficients into a first approximation of the degraded frame;

generating a second approximation of the degraded frame using a motion vector between the modified reference frame and the first approximation of the degraded frame; and storing the second approximation of the degraded frame in place of the degraded frame in the computer-readable medium;

wherein the storing of the second approximation of the degraded frame comprises:

generating a third approximation of the degraded frame by modifying the second approximation of the degraded frame using a set of low-frequency coefficients determined from the set of watermark coefficients; and storing the third approximation of the degraded frame in place of the degraded frame; and wherein the generating of the third approximation of the degraded frame comprises:

generating a set of reconstructed frame coefficients by converting the second approximation of the degraded image into the frequency domain;

identifying a subset of reconstructed frame coefficients corresponding to low-frequency coefficients;

modifying the set of reconstructed frame coefficients by replacing the subset of reconstructed frame coefficients with the set of low-frequency coefficients determined from the watermark coefficients; and generating the third approximation of the degraded frame by converting the modified set of reconstructed frame coefficients into the spatial domain.

8. The computer-readable medium of claim 7, wherein the extracting of the set of watermark coefficients comprises:

obtaining a watermark position indicator specifying locations of the set of watermark coefficients among the set of image coefficients; and extracting the set of watermark coefficients from coefficients at the locations among the set of image coefficients.

9. The computer-readable medium of claim 7, wherein the extracting of the set of watermark coefficients comprises:

extracting a plurality of versions of the watermark coefficients from the transformed image frame; and determining the set of watermark coefficients from a measure of central tendency across the plurality of versions of the watermark coefficients.

10. The computer-readable medium of claim 7, wherein the generating of the second approximation of the degraded frame comprises:

determining the motion vector based on a comparison between the modified reference frame and the first approximation of the degraded frame; and generating the second approximation of the degraded frame by applying the motion vector to the modified reference frame.

11. The computer-readable medium of claim 7, wherein:

the generating of the set of reconstructed frame coefficients comprises applying a linear transform to one or more properties of an array of pixels representing the second approximation of the degraded image; and the generating of the third approximation of the degraded frame comprises applying an inverse of the linear transform to the modified set of reconstructed frame coefficients.

12. The computer-readable medium of claim 7, wherein the plurality of instructions are further executable by the at least one processor apparatus to perform steps comprising determining the motion vector based on a comparison between the modified reference frame and the first approximation of the degraded frame;

wherein the generating of the second approximation of the degraded frame using the motion vector comprises applying the determined motion vector to the modified reference frame.

13. A camera apparatus configured to reconstruct a video frame, the camera apparatus comprising:

an image sensor configured to capture a video, the video comprising a plurality of frames captured by the image sensor;

a processor apparatus;

a non-transitory computer-readable storage medium having a computer program thereon, the computer program comprising a plurality of instructions configured to, when executed by the processor apparatus, cause the processor apparatus to:

access a modified reference frame from the video, the modified reference frame being temporally proximate to a degraded frame in the video, the modified reference frame comprising a watermark representative of a low-resolution version of the degraded frame;

generate a transformed image frame, the generation of the transformed image frame comprising a conversion of the modified reference frame into a set of image coefficients in a frequency domain;

extract a set of watermark coefficients representative of the watermark;

convert the set of watermark coefficients into a first approximation of the degraded frame;

generate a second approximation of the degraded frame via a motion vector between the modified reference frame and the first approximation of the degraded frame; and store the second approximation of the degraded frame in place of the degraded frame;

wherein the storage of the second approximation of the degraded frame comprises:

generation of a third approximation of the degraded frame by modifying the second approximation of the degraded frame using a set of low-frequency coefficients determined from the set of watermark coefficients; and storage of the third approximation of the degraded frame in place of the degraded frame, wherein the generation of the third approximation of the degraded frame comprises:

generation of a set of reconstructed frame coefficients via conversion of the second approximation of the degraded image into the frequency domain;

identification of a subset of reconstructed frame coefficients corresponding to low-frequency coefficients;

modification of the set of reconstructed frame coefficients via replacement of the subset of reconstructed frame coefficients with the set of low-frequency coefficients determined from the watermark coefficients; and generation of the third approximation of the degraded frame via conversion the modified set of reconstructed frame coefficients into the spatial domain.

14. The camera apparatus of claim 13, wherein the extraction of the set of watermark coefficients comprises:

obtaining of a watermark position indicator specifying locations of the set of watermark coefficients among the set of image coefficients; and extraction of the set of watermark coefficients from coefficients at the locations among the set of image coefficients.

15. The camera apparatus of claim 13, wherein the extraction of the set of watermark coefficients comprises:

extraction of a plurality of versions of the watermark coefficients from the transformed image frame; and determination of the set of watermark coefficients from a measure of central tendency across the plurality of versions of the watermark coefficients.

16. The camera apparatus of claim 13, wherein the generation of the second approximation of the degraded frame comprises:

determination of the motion vector based on a comparison between the modified reference frame and the first approximation of the degraded frame; and generation of the second approximation of the degraded frame by application of the motion vector to the modified reference frame.

17. The camera apparatus of claim 13, wherein:

the generation of the set of reconstructed frame coefficients comprises an application of a linear transform to one or more properties of an array of pixels representing the second approximation of the degraded image; and the generation of the third approximation of the degraded frame comprises an application of an inverse of the linear transform to the modified set of reconstructed frame coefficients.

18. The camera apparatus of claim 13, wherein the plurality of instructions are further configured to, when executed by the processor apparatus, cause the processor apparatus to determine the motion vector based on a comparison between the modified reference frame and the first approximation of the degraded frame;

wherein the generation of the second approximation of the degraded frame via the motion vector comprises an application of the determined motion vector to the modified reference frame.

19. The camera apparatus of claim 13, further comprising a lens and a focus controller, the focus controller being configured to control operations of the lens.

20. The camera apparatus of claim 13, further comprising an interface configured to perform data communication with an external computerized device via a wired or wireless network.

21. A computerized apparatus configured to reconstruct a video frame, the apparatus comprising:

means for accessing a modified reference frame from a video, the modified reference frame temporally proximate to a degraded frame in the video, the modified reference frame including a watermark representative of a low-resolution version of the degraded frame;

means for generating a transformed image frame via conversion of the modified reference frame into a set of image coefficients in a frequency domain;

means for extracting a set of watermark coefficients representative of the watermark;

means for converting the set of watermark coefficients into a first approximation of the degraded frame;

means for generating a second approximation of the degraded frame via a motion vector between the modified reference frame and the first approximation of the degraded frame; and means for storing the second approximation of the degraded frame in place of the degraded frame;

wherein the means for storing of the second approximation of the degraded frame comprises:

means for generating a third approximation of the degraded frame by modifying the second approximation of the degraded frame via a set of low-frequency coefficients determined from the set of watermark coefficients; and means for storing the third approximation of the degraded frame in place of the degraded frame; and wherein the means for generating of the third approximation of the degraded frame comprises:

means for generating a set of reconstructed frame coefficients via conversion of the second approximation of the degraded image into the frequency domain;

means for identifying a subset of reconstructed frame coefficients corresponding to low-frequency coefficients;

means for modifying the set of reconstructed frame coefficients via replacement of the subset of reconstructed frame coefficients with the set of low-frequency coefficients determined from the watermark coefficients; and means for generating the third approximation of the degraded frame via conversion of the modified set of reconstructed frame coefficients into the spatial domain.

22. The computerized apparatus of claim 21, wherein the means for extracting the set of watermark coefficients comprises:

means for obtaining a watermark position indicator configured to specify locations of the set of watermark coefficients among the set of image coefficients; and means for extracting the set of watermark coefficients from coefficients at the locations among the set of image coefficients.

23. The computerized apparatus of claim 21, wherein the means for extracting the set of watermark coefficients comprises:

means for extracting a plurality of versions of the watermark coefficients from the transformed image frame; and means for determining the set of watermark coefficients from a measure of central tendency across the plurality of versions of the watermark coefficients.

24. The computerized apparatus of claim 21, wherein the means for generating the second approximation of the degraded frame comprises:

means for determining the motion vector based on a comparison between the modified reference frame and the first approximation of the degraded frame; and means for generating the second approximation of the degraded frame via application of the motion vector to the modified reference frame.

25. The computerized apparatus of claim 21, wherein:

the means for generating the set of reconstructed frame coefficients comprises an application of a linear transform to one or more properties of an array of pixels representing the second approximation of the degraded image; and the means for generating the third approximation of the degraded frame comprises an application of an inverse of the linear transform to the modified set of reconstructed frame coefficients.

26. The computerized apparatus of claim 19, wherein the apparatus further comprises means for determining the motion vector based on a comparison between the modified reference frame and the first approximation of the degraded frame;

wherein the means for generating of the second approximation of the degraded frame using the motion vector comprises means for applying the determined motion vector to the modified reference frame.

* * * * *